US010789350B2

(12) United States Patent
Turner et al.

(10) Patent No.: US 10,789,350 B2
(45) Date of Patent: Sep. 29, 2020

(54) COMPUTERIZED SYSTEM AND METHOD FOR ASSOCIATING RF SIGNALS

(71) Applicant: VeriFone, Inc., San Jose, CA (US)

(72) Inventors: Aaron Robert Turner, Idaho Falls, ID (US); Robert Michael McMillon, II, Cumming, GA (US)

(73) Assignee: VeriFone, Inc., San Jose, CA (US)

( * ) Notice: Subject to any disclaimer, the term of this patent is extended or adjusted under 35 U.S.C. 154(b) by 331 days.

(21) Appl. No.: 15/567,174

(22) PCT Filed: Apr. 11, 2016

(86) PCT No.: PCT/US2016/026873
§ 371 (c)(1),
(2) Date: Oct. 17, 2017

(87) PCT Pub. No.: WO2016/168101
PCT Pub. Date: Oct. 20, 2016

(65) Prior Publication Data
US 2018/0096122 A1    Apr. 5, 2018

Related U.S. Application Data

(60) Provisional application No. 62/149,375, filed on Apr. 17, 2015, provisional application No. 62/243,348, filed on Oct. 19, 2015.

(51) Int. Cl.
*G06F 21/35* (2013.01)
*G06Q 20/32* (2012.01)
(Continued)

(52) U.S. Cl.
CPC ............. *G06F 21/35* (2013.01); *G06F 21/31* (2013.01); *G06F 21/32* (2013.01); *G06F 21/44* (2013.01);
(Continued)

(58) Field of Classification Search
None
See application file for complete search history.

(56) References Cited

U.S. PATENT DOCUMENTS

2005/0270156 A1* 12/2005 Ravet ................ A63B 24/0021
340/572.1
2007/0030116 A1* 2/2007 Feher ................... H04W 64/00
340/5.53
(Continued)

FOREIGN PATENT DOCUMENTS

EP        2624534 A2    8/2013

OTHER PUBLICATIONS

International Search Report, International Application No. PCT/US2016/026873, dated Aug. 19, 2016, pp. 1-4.
(Continued)

*Primary Examiner* — William J. Goodchild
(74) *Attorney, Agent, or Firm* — Greenberg Traurig LLP

(57) ABSTRACT

A computerized system for associating RF signals, the system including at least one sensor configured to sense a plurality of RF signals at at least a plurality of points in time and a computerized associator receiving outputs from the at least one sensor and providing an output which associates at least some of the plurality of RF signals with at least one unique multiple RF signal-based identifier.

6 Claims, 20 Drawing Sheets

(51) Int. Cl.
*G06F 21/32* (2013.01)
*G06F 21/44* (2013.01)
*G06F 21/31* (2013.01)
*G06Q 30/02* (2012.01)

(52) U.S. Cl.
CPC ......... *G06Q 20/3278* (2013.01); *G06Q 30/02* (2013.01)

(56) References Cited

U.S. PATENT DOCUMENTS

| | | | |
|---|---|---|---|
| 2008/0068153 A1 | 3/2008 | Doan et al. | |
| 2008/0073431 A1* | 3/2008 | Davis | G06K 17/0022 235/383 |
| 2009/0048953 A1* | 2/2009 | Hazel | G07F 7/1008 705/35 |
| 2011/0018995 A1* | 1/2011 | Hazzani | G08B 13/19697 348/143 |
| 2011/0134240 A1* | 6/2011 | Anderson | H04W 4/029 348/143 |
| 2013/0138492 A1* | 5/2013 | Delgado | G06Q 30/02 705/14.25 |
| 2014/0081734 A1 | 3/2014 | Gangi | |
| 2014/0280321 A1* | 9/2014 | Saib | G06Q 30/0267 707/770 |

OTHER PUBLICATIONS

European Patent Office, Communication including Extended European Search Report, European Patent Application No. 16780507.6, pp. 1-4, dated Oct. 25, 2018.

* cited by examiner

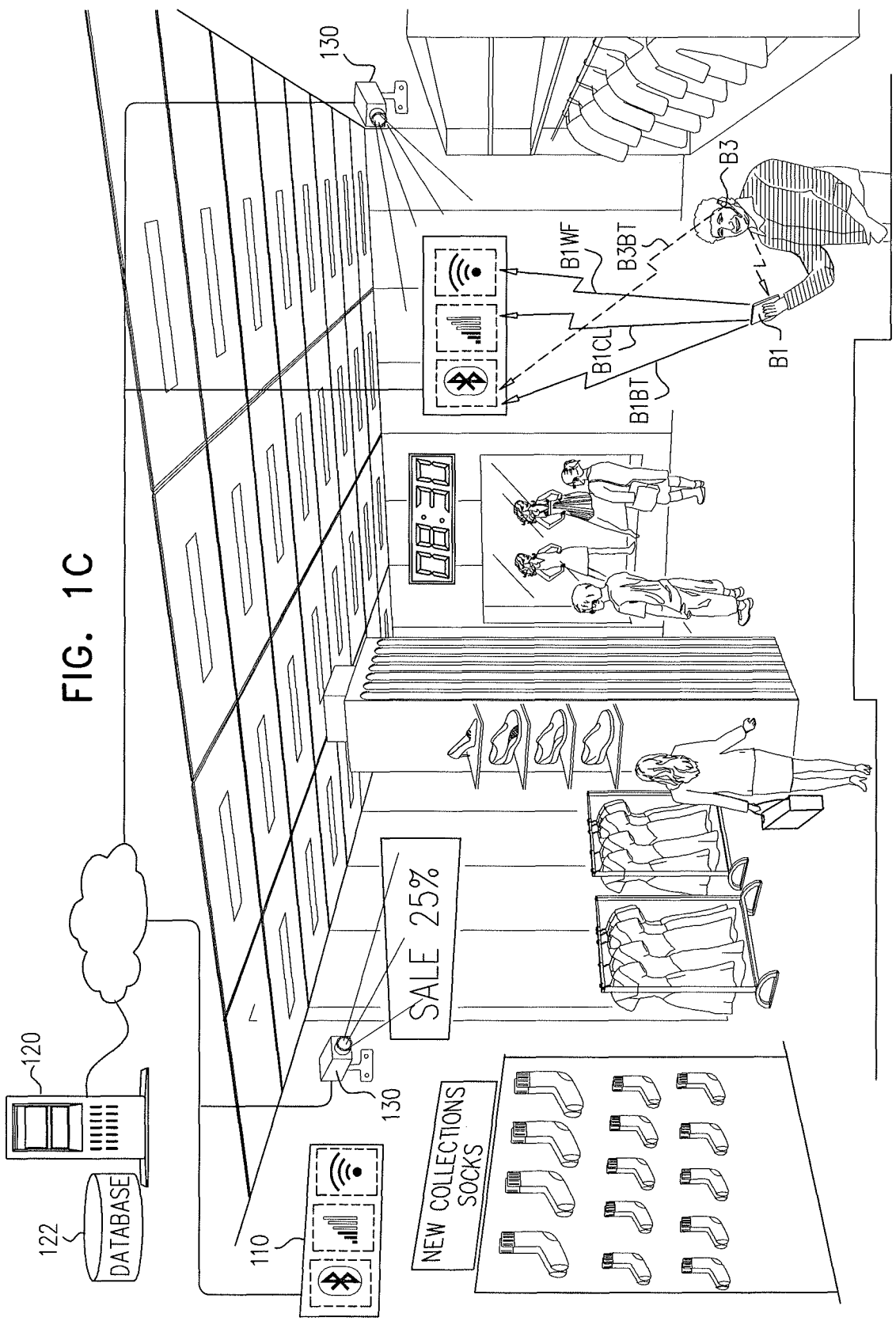

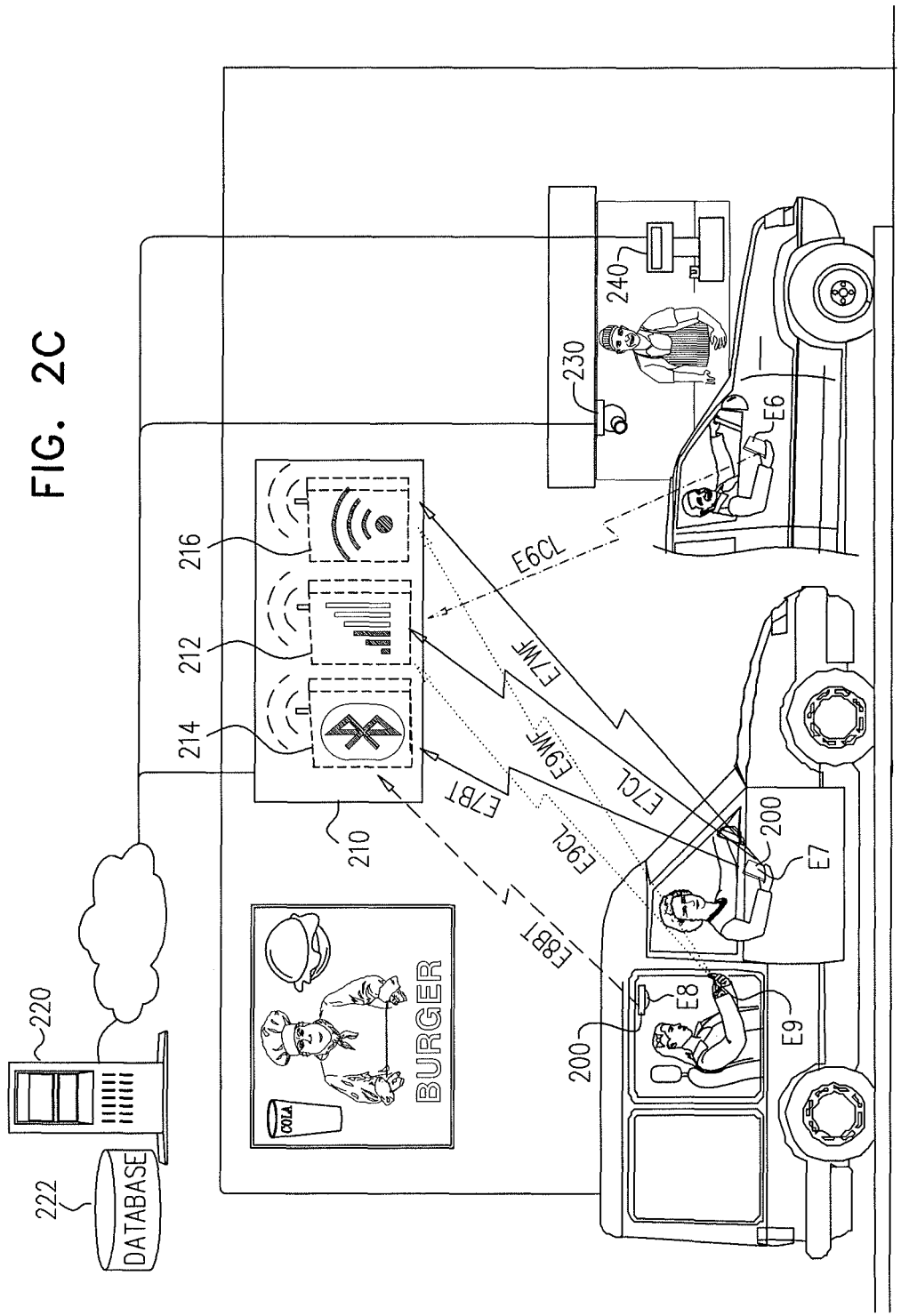

COMPUTERIZED SYSTEM AND METHOD FOR ASSOCIATING RF SIGNALS

REFERENCE TO RELATED APPLICATIONS

This application is a U.S. National Stage of International Patent Application No. PCT/US2016/026873 filed Apr. 11, 2016, entitled "Computerized System And Method For Associating RF Signals," which claims priority to U.S. Provisional Patent Application Ser. No. 62/149,375, filed Apr. 17, 2015, entitled "System And Method To Create Unique Identifiers By Identifying And Correlating A Plurality Of Digital Radio Frequencies" and U.S. Provisional Patent Application Ser. No. 62/243,348, filed Oct. 19, 2015, entitled "Distributed Unlicensed Radio Frequency Spectrum Monitoring Analysis And Reporting System," the disclosures of which are incorporated by reference in their entireties.

FIELD OF THE INVENTION

The present invention relates generally to identification of a plurality of digital frequencies and generation of a unique identifier based on the plurality of digital frequencies.

BACKGROUND OF THE INVENTION

Personal electronic devices, such as smartphones and wearable technology, broadcast unique radio signals.

SUMMARY OF THE INVENTION

The present invention seeks to provide a system and method for identification of a plurality of digital frequencies and generation of a unique identifier based on the plurality of digital frequencies.

There is thus provided in accordance with a preferred embodiment of the present invention a computerized system for associating RF signals, the system including at least one sensor configured to sense a plurality of RF signals at at least a plurality of points in time and a computerized associator receiving outputs from the at least one sensor and providing an output which associates at least some of the plurality of RF signals with at least one unique multiple RF signal-based identifier.

There is also provided in accordance with another preferred embodiment of the present invention a computerized system for associating RF signals with an individual, the system including at least one sensor configured to sense a plurality of RF signals at at least a plurality of points in time and a computerized signal associator receiving outputs from the at least one sensor and providing an output which associates at least some of the plurality of RF signals and individual biometric data and generates a unique multiple RF signal-based individual identifier.

There is further provided in accordance with yet another preferred embodiment of the present invention a computerized system for associating RF signals in a transactional environment, the system including at least one sensor configured to sense a plurality of RF signals at at least a plurality of points in time and a computerized signal associator receiving outputs from the at least one sensor and providing an output which associates at least some of the plurality of RF signals with transaction data and generates a unique multiple RF signal-based transaction identifier.

There is yet further provided in accordance with still another preferred embodiment of the present invention a computerized system for associating RF signals in a transactional environment, the system including at least one sensor configured to sense a plurality of RF signals at at least a plurality of points in time and a computerized signal associator receiving outputs from the at least one sensor and providing a output which associates at least some of the plurality of RF signals with individual biometric data and with transaction data and generates a unique multiple RF signal-based, transaction-based individual identifier.

In accordance with a preferred embodiment of the present invention the at least one sensor senses at least one unique device identifying portion of each of the plurality of RF signals. Additionally or alternatively, the at least one sensor does not sense content of the plurality of RF signals. Preferably, the at least one sensor senses at least one of dialing, routing, addressing and signaling data of the plurality of RF signals. Additionally or alternatively, the at least one sensor senses at least one of a MAC address, a UDID, an IMEI, a MSIDSN, an IMSI and an RFID.

In accordance with a preferred embodiment of the present invention the outputs from the at least one sensor include an indication of signal strength of at least some of the plurality of RF signals.

There is even further provided in accordance with another preferred embodiment of the present invention a computerized transactional security system including a computerized subsystem for associating RF signals in a transactional environment, the computerized subsystem including at least one first sensor configured to sense a plurality of RF signals at at least a plurality of points in time and a computerized transaction-based signal associator receiving outputs from the at least one first sensor and providing an output which associates at least some of the plurality of RF signals with transaction data and generates a unique multiple RF signal-based transaction identifier and an authentication subsystem employing the unique multiple RF signal-based transaction identifier for authentication of the bona fides of a person wishing to carry out a transaction, the authentication subsystem including at least one second sensor configured to sense a plurality of RF signals at a proposed transaction instance subsequent to the at least a plurality of points in time, a computerized transaction-based signal associator receiving outputs at the proposed transaction instance from the at least one second sensor and providing an output which associates at least some of the plurality of RF signals received by the at least one second sensor with proposed transaction data and generates a unique multiple RF signal-based proposed transaction identifier and a bona fides ascertainer which ascertains whether a match exists between the unique multiple RF signal-based transaction identifier and the unique multiple RF signal-based proposed transaction identifier and provides an output indicating at least one of the presence of the match, absence of the match and partial presence of the match.

Preferably, the at least one first sensor and the at least one second sensor are the same at least one sensor operating at different points in time.

In accordance with a preferred embodiment of the present invention the computerized transactional security system also includes an alert subsystem operative to provide an alert based on the output of the bona fides ascertainer.

Preferably, the partial presence of the match between the unique multiple RF signal-based transaction identifier and the unique multiple RF signal-based proposed transaction identifier occurs when not all of the RF signals represented by the unique multiple RF signal-based transaction identifier are represented by the unique multiple RF signal-based proposed transaction identifier. Additionally or alternatively, the partial presence of the match between the unique multiple RF signal-based transaction identifier and the unique multiple RF signal-based proposed transaction identifier occurs when at least some transaction data represented by the unique multiple RF signal-based transaction identifier is not represented by the unique multiple RF signal-based proposed transaction identifier.

There is also provided in accordance with yet another preferred embodiment of the present invention a computerized non-visible signal based surveillance system including a computerized subsystem for associating RF signals in a transactional environment, the computerized subsystem including at least one sensor configured to sense a plurality of RF signals emitted from within a predetermined range of the at least one sensor at at least a plurality of points in time and a computerized signal associator receiving outputs from the at least one first sensor and providing an output which associates at least some of the plurality of RF signals and generates a unique RF signal-based identifier and an alert generating subsystem employing the unique RF signal-based identifier for identifying at least one of an unauthorized person and an unauthorized device based at least in part on the unique RF signal-based identifier.

In accordance with a preferred embodiment of the present invention the alert generating subsystem senses persistence of at least some of the plurality of RF signals. Additionally or alternatively, the alert generating subsystem is operative to sense the presence of a beacon based on persistence of at least some of the plurality of RF signals beyond a predetermined threshold.

Preferably, the computerized signal associator also receives an output from at least one of a camera and a POS device and provides an output which associates at least some of the plurality of RF signals and the output from at least one of a camera and a POS device and generates a unique RF signal-based and camera and/or POS device-based individual identifier. Additionally, the alert generating subsystem employs the RF signal-based and camera and/or POS device-based individual identifier for identifying a person whose presence is sensed solely on the basis of the plurality of RF signals. Preferably, the computerized non-visible signal based surveillance system also includes a welcome annunciator subsystem which is operative in response to an output of the alert generating subsystem for annunciating a welcome message to the person whose presence is sensed solely on the basis of the plurality of RF signals.

Preferably, the system also includes a signal origin ascertaining subsystem operative to ascertain whether at least some of the plurality of RF signals are transmitted from a single mobile device in different frequency bands. In accordance with a preferred embodiment of the present invention the plurality of RF signals includes at least two of a Bluetooth signal, a Wi-Fi signal, an NFC signal and a cellular-radio signal.

In accordance with a preferred embodiment of the present invention the at least one sensor includes a plurality of sensors operating in different frequency bands.

Preferably, the signal origin ascertaining subsystem is operative to distinguish between RF signals which are transmitted from at least some of cellular telephones, smartphones, tablets, laptops, speakerphones, watches, pagers and vehicle based devices. Additionally or alternatively, the signal origin ascertaining subsystem is operative to provide short-range identification of a mobile device within a five-meter radius of at least one of the at least one sensor and long-range identification of a mobile device within a 15 meter radius of at least one of the at least one sensor.

Preferably, the annunciator subsystem also provides a message based on at least one of a sensed person's personal preferences and demographic data.

There is further provided in accordance with still another preferred embodiment of the present invention a computerized method for associating RF signals, the method including sensing a plurality of RF signals at at least a plurality of points in time and associating the plurality of RF signals with at least one unique multiple RF signal-based identifier.

There is also provided in accordance with yet another preferred embodiment of the present invention a computerized method for associating RF signals with an individual, the method including sensing a plurality of RF signals at at least a plurality of points in time and associating at least some the plurality of RF signals and individual biometric data with at least one unique multiple RF signal-based individual identifier.

There is even further provided in accordance with another preferred embodiment of the present invention a computerized method for associating RF signals in a transactional environment, the method including sensing a plurality of RF signals at at least a plurality of points in time and associating at least some of the plurality of RF signals with transaction data and generating a unique multiple RF signal-based transaction identifier.

There is also provided in accordance with yet another preferred embodiment of the present invention a computerized method for associating RF signals in a transactional environment, the method including sensing a plurality of RF signals at at least a plurality of points in time and associating at least some of the plurality of RF signals with individual biometric data and with transaction data and generating a unique multiple RF signal-based, transaction-based individual identifier.

Preferably, the sensing a plurality of RF signals includes sensing at least one unique, device identifying portion of each of the plurality of RF signals. Additionally or alternatively, the sensing a plurality of RF signals does not include sensing signal content. In accordance with a preferred embodiment of the present invention the sensing a plurality of RF signals includes sensing at least one of dialing, routing, addressing and signaling data.

Preferably, the sensing a plurality of RF signals includes sensing signal strength of at least some of the plurality of RF signals.

There is still further provided in accordance with still another preferred embodiment of the present invention a computerized transactional security method including employing a computer for associating RF signals in a transactional environment, the employing a computer including sensing a plurality of RF signals at at least a plurality of points in time and associating the plurality of RF signals with at least one unique multiple RF signal-based identifier, employing the unique multiple RF signal-based transaction identifier for authentication of the bona fides of a person wishing to carry out a transaction, the employing the unique multiple RF signal-based transaction identifier for authentication including sensing a plurality of RF signals at a proposed transaction instance subsequent to the at least a plurality of points in time and associating the plurality of RF signals at the proposed transaction instance with proposed transaction data, thereby generating a unique multiple RF signal-based proposed transaction identifier and ascertaining whether a match exists between the unique multiple RF signal-based transaction identifier and the unique multiple RF signal-based proposed transaction identifier and providing an output indicating at least one of the presence of the match, absence of the match and partial presence of the match.

In accordance with a preferred embodiment of the present invention the computerized transactional security method also includes providing an alert based on the output of the ascertaining.

Preferably, the partial presence of the match between the unique multiple RF signal-based transaction identifier and the unique multiple RF signal-based proposed transaction identifier occurs when not all of the RF signals represented by the unique multiple RF signal-based transaction identifier are represented by the unique multiple RF signal-based proposed transaction identifier. Additionally or alternatively, the partial presence of the match between the unique multiple RF signal-based transaction identifier and the unique multiple RF signal-based proposed transaction identifier occurs when at least some transaction data represented by the unique multiple RF signal-based transaction identifier is not represented by the unique multiple RF signal-based proposed transaction identifier.

There is even further provided in accordance with yet another preferred embodiment of the present invention a computerized non-visible signal based surveillance method including associating RF signals in a transactional environment including sensing a plurality of RF signals emitted from within a predetermined range of at least one sensor at at least a plurality of points in time and associating at least some of the plurality of RF signals and generating a unique RF signal-based identifier and ascertaining the presence of at least one of an unauthorized person and an unauthorized device based at least in part on the unique RF signal-based identifier.

Preferably, the ascertaining includes sensing persistence of at least some of the plurality of RF signals. Additionally or alternatively, the ascertaining includes sensing the presence of a beacon based on persistence of at least some of the plurality of RF signals beyond a predetermined threshold.

In accordance with a preferred embodiment of the present invention the associating at least some of the plurality of RF signals and generating a unique RF signal-based identifier also employs an output from at least one of a camera and a POS device and provides an output which associates at least some of the plurality of RF signals and the output from at least one of a camera and a POS device and generates a unique RF signal-based and camera and/or POS device-based individual identifier. Additionally, the ascertaining includes employing the RF signal-based and camera and/or POS device-based individual identifier for identifying a person whose presence is sensed solely on the basis of the plurality of RF signals. Additionally, the computerized non-visible signal based surveillance method also includes annunciating a welcome message to the person whose presence is sensed solely on the basis of the plurality of RF signals.

Preferably, the method also includes ascertaining whether at least some of the plurality of RF signals are transmitted from a single mobile device in different frequency bands. Additionally, the plurality of RF signals includes at least two of a Bluetooth signal, a Wi-Fi signal, an NFC signal and a cellular-radio signal.

In accordance with a preferred embodiment of the present invention the sensing a plurality of RF signals employs a plurality of sensors operating in different frequency bands. Additionally or alternatively, the ascertaining whether at least some of the plurality of RF signals are transmitted from a single mobile device distinguishes between RF signals which are transmitted from at least some of cellular telephones, smartphones, tablets, laptops, speakerphones, watches, pagers and vehicle based devices.

Preferably, the ascertaining whether at least some of the plurality of RF signals are transmitted from a single mobile device is operative to provide short-range identification of a mobile device within a five-meter radius of at least one of a plurality of sensors and long-range identification of a mobile device within a 15 meter radius of at least one of a plurality of sensors.

In accordance with a preferred embodiment of the present invention the annunciating provides a message based on at least one of a sensed person's personal preferences and demographic data.

There is still further provided in accordance with still another preferred embodiment of the present invention a method of identifying an individual, the method including mounting at least one sensor in a business location, the sensor configured to detect and capture a plurality of signals and connecting the at least one sensor to a processor in communication with the at least one sensor, the processor configured to correlate the plurality of signals based on predetermined criteria and to at least one of generate a unique identifier based on the plurality of signals and match the plurality of signals to an existing unique identifier contained in a database, at least one of the unique identifier or the existing unique identifier being associated with the individual.

Preferably, the plurality of signals are transmitted from a single mobile device. In accordance with a preferred embodiment of the present invention the plurality of signals includes three radio frequencies transmitted from a single mobile device. Additionally, the three radio frequencies include a Bluetooth signal, a Wi-Fi signal, and a cellular-radio signal.

Preferably, the at least one sensor includes a plurality of sensors. Additionally, each of the plurality of sensors are mounted at one of an internal location and an external location in the business location. Additionally or alternatively, the plurality of signals are transmitted from at least one of a handheld mobile device and an automobile associated with a user of a handheld mobile device.

In accordance with a preferred embodiment of the present invention the plurality of sensors are operable to perform at least one of short-range identification of a mobile device within a five-meter radius of at least one of the plurality of sensors and long-range identification of a mobile device within a 15 meter radius of at least one of the plurality of sensors.

Preferably, the processor is further configured to associate the unique identifier with a purchase made by a user associated with the unique identifier based on a transaction that occurs when the user is within a predetermined proximity to the at least one sensor. Additionally or alternatively, the processor is further configured to differentiate between the plurality of signals and identify different users associated with the plurality of signals.

In accordance with a preferred embodiment of the present invention the processor is further configured to categorize the different users based on one or more predetermined characteristics of the plurality of signals associated with the different users. Additionally or alternatively, the processor is further configured to categorize the different users based on one or more signal strength measurements associated with the plurality of signals.

In accordance with a preferred embodiment of the present invention the plurality of sensors mounted at the external location are operable to collect information to enable the processor to identify at least one vehicle associated with the plurality of signals.

BRIEF DESCRIPTION OF THE DRAWINGS

The present invention will be understood and appreciated more fully from the following detailed description in which:

FIGS. 1A-1E are simplified illustrations of the operation of a computerized system for associating RF signals constructed and operative in accordance with a preferred embodiment of the present invention;

FIGS. 2A-2E are simplified illustrations of the operation of a computerized system for associating RF signals constructed and operative in accordance with another preferred embodiment of the present invention;

DETAILED DESCRIPTION OF PREFERRED EMBODIMENTS

Reference is now made to FIGS. 1A-1E, which are simplified illustrations of the operation of a computerized system for associating RF signals constructed and operative in accordance with a preferred embodiment of the present invention.

Figure 1A:
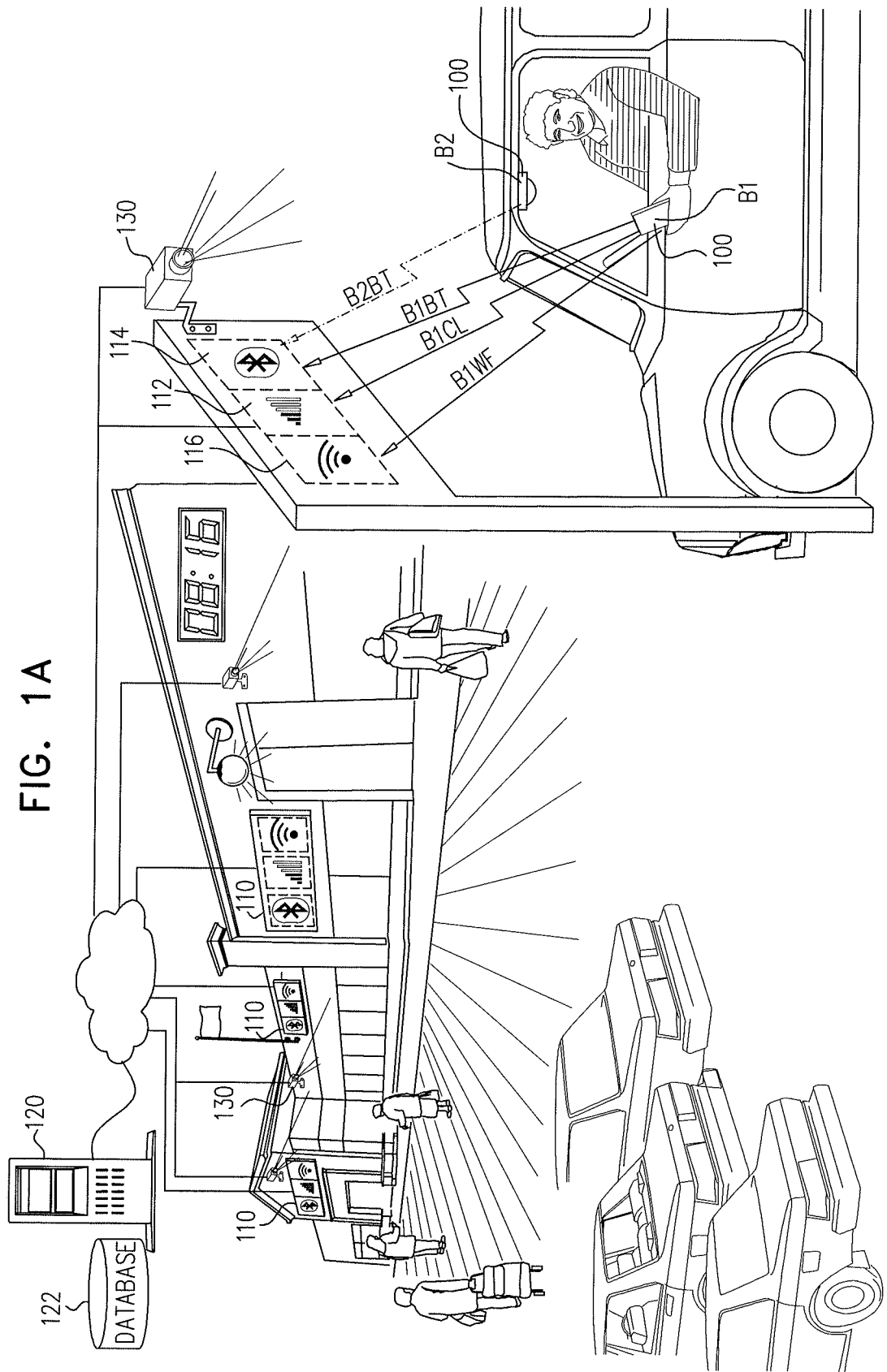

As seen in FIGS. 1A-1E, in a typical scenario, an individual is present at a venue, such as a department store. FIG. 1A shows a customer driving a vehicle and entering a parking lot of the department store. The customer has in his possession an RF communications device 100, typically a smartphone. Examples of currently available RF communications devices include cellular telephones, smartphones, tablets, laptops, speakerphones, watches and pagers. The vehicle includes at least one RF communications device 100, such as a Bluetooth speakerphone.

Each RF communications device 100 outputs at least one unique, device identifying RF (UDIRF) signal. The UDIRF signal by definition does not include signal content but normally does include at least one of dialing, routing, addressing and signaling (ALODRAS) data, such as, for example, a MAC address or an International Subscriber Identity (IMSI). "Signal content" for this purpose includes the message that is being communicated via the device between users, for example voice, text, images or other information communicated by a user.

A typical RF communications device 100 may output multiple UDIRF signals, each typically in a different RF frequency band. Examples of UDIRF signals include cellular telephone signals in any of the following frequency bands: 700 MHz; 800 MHz; 1900 MHz; 2100 MHz and 2.5 GHz, Bluetooth and BLE signals in the 2.4 GHz ISM Band; NFC signals in the 13.56 MHz frequency band and WIFI signals in the following frequency bands: 2.5 GHz and 5 GHz. The Bluetooth, WIFI and NFC signals are typically in unlicensed bands.

Preferably each UDIRF signal includes a unique device identifier. Examples of device identifiers included in various types of UDIRF signals include:

For Bluetooth and WIFI, the unique device identifier is a MAC address. Typically, each Bluetooth and WIFI UDIRF signal has a MAC address. Typically Bluetooth and WIFI signals emitted by a single device have sequential MAC addresses, each of which is a 48 bit address and is also known as an Extended Unique Identifier (EUI). The Extended Unique Identifiers are managed by the IEEE Registration Authority. The first 24 bits of each EUI is an Organizationally Unique Identifier (OUI). Each OUI is assigned to a particular manufacturer by the IEEE. Every device has $2^{24}$ unique MAC addresses, each having an OUI as a 24 bit prefix. The same MAC address is never programmed onto more than one device.

For cellular telephone signals, the unique device identifier may be any one or more of a UDID, an Android ID, an International Mobile Station Equipment Identity (IMEI), a Mobile Station ISDN (MSISDN) and an International Mobile Subscriber Identity (IMSI) depending on the manufacturer of the telephone.

For NFC, the unique device identifier is a 7 bit unique identifier (RFID) programmed by the manufacturer.

A plurality of sensor assemblies 110 are located at the venue and are configured to receive the UDIRF signals from the various RF communications devices 100 at the venue. For example, each sensor assembly 110 may include a cellular signal receiver 112, a Bluetooth signal receiver 114 and a WIFI signal receiver 116. Outputs of the one or more sensor assemblies 110 are preferably supplied via any suitable communication network to a server 120, having associated therewith at least one database 122. Preferably, the geolocation of each sensor assembly 110 is made known to the server 120.

Preferably, a plurality of cameras 130 are provided at the venue to photograph individuals. Outputs of cameras 130 are also preferably supplied via any suitable communication network to server 120. Cameras 130 may be used to sense biometric information regarding individuals. Alternatively or additionally, other types of biometric information sensors may be employed in the system. A point of sale terminal 140 (FIG. 1B) is preferably present at the venue and an output thereof may be supplied via any suitable communication network to server 120.

Although it is understood that typically a very large number of RF communications devices are present at a given venue at any given time, for simplicity and clarity of description, in the embodiment of FIGS. 1A-1E, simultaneous operation of only two RF communications devices 100 is described.

Turning initially to FIG. 1A, two RF communications devices 100 are shown to be present in the venue at a given time. A first device, here a cellular telephone in the hand of a customer, is labeled B1 and typically outputs three UDIRF signals, typically a Bluetooth signal, a WIFI signal and a cellular telephone signal, here respectively designated as B1BT, B1WF and B1CL. A second device, which is typically a Bluetooth speaker phone in the vehicle, is labeled B2 and typically outputs one UDIRF signal, a Bluetooth signal, here designated as B2BT.

In accordance with a preferred embodiment of the present invention, multiple sensor assemblies 110 receive all of the above UDIRF signals from devices B1 and B2 at various signal strengths, which are a function of the location of the devices relative to the sensor assemblies 110. Signal strength is typically measured in dBm. The sensor assemblies 110 transmit to server 120 at least the unique device identifiers which form part of the UDIRF signals preferably together with a timestamp and preferably together with a sensor assembly identifier and a metric of signal strength which provides information relating to relative location of the device in the venue.

When multiple sensor assemblies 110 are provided, triangulation may be employed to enhance location information. In such a case, the location of each sensor assembly 110 outputting to server 120 is preferably stored in database 122. The timestamp may be provided by one or more of RF communications devices 100, sensor assembly 110 and server 120.

Preferably, the face of the customer is photographed by camera 130.

Figure 1B:
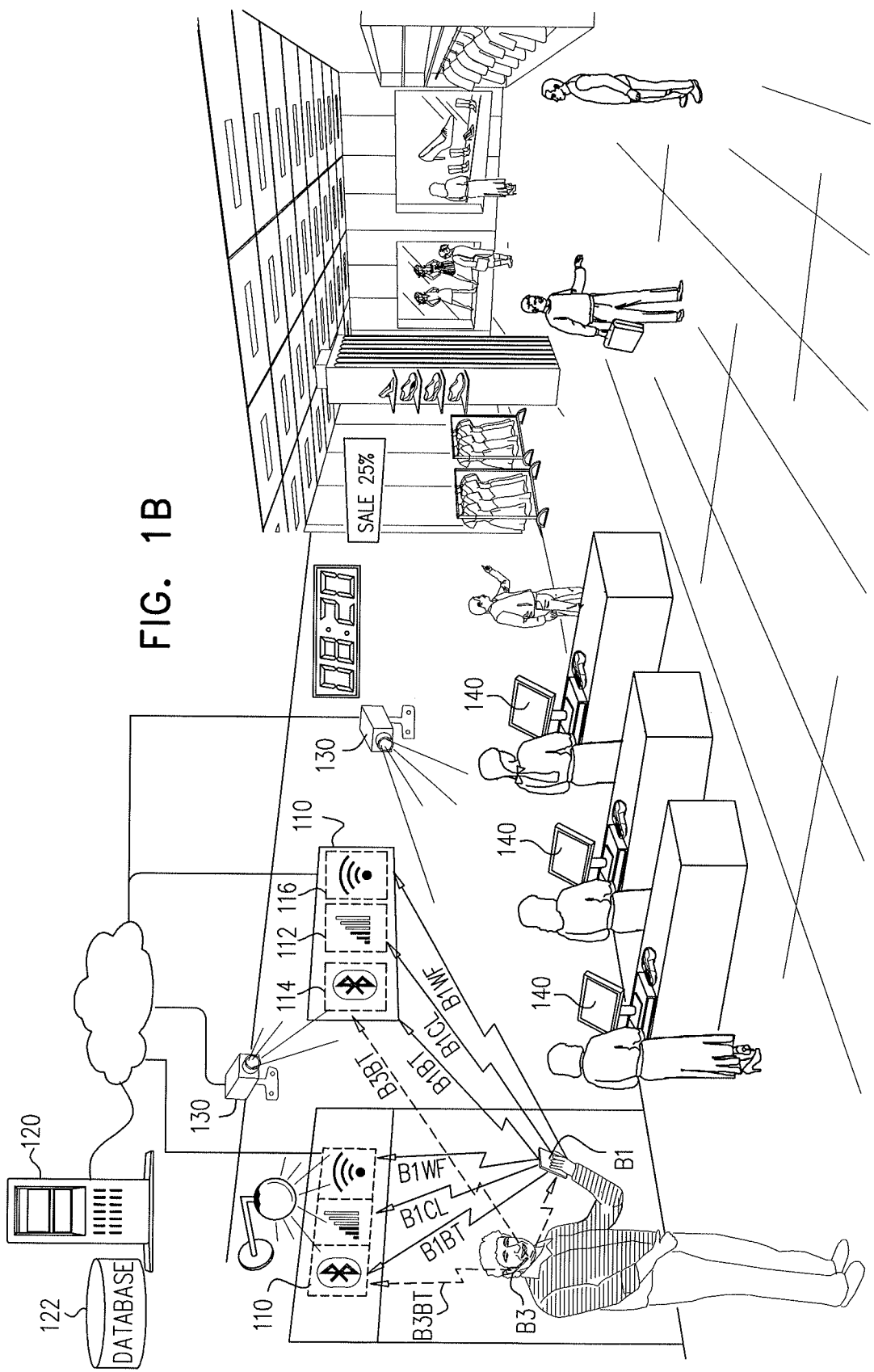

Turning now additionally to FIG. 1B, which shows the venue of FIG. 1A at a time approximately 4 minutes later than that shown in FIG. 1A. It is seen that the customer, who is using an additional RF communications device 100, here a Bluetooth earpiece, here designated B3, has entered the department store. At this time device B2 is no longer transmitting and device B1 continues to transmit its signals. Device B3 preferably outputs one UDIRF signal, a Bluetooth signal, here designated as B3BT.

In accordance with a preferred embodiment of the present invention, multiple sensor assemblies 110 receive all of the above UDIRF signals from devices B1 and B3 at various signal strengths which are a function of the location of the devices relative to the sensor assemblies 110. The sensor assemblies 110 transmit to server 120 at least the unique device identifiers which form part of the UDIRF signals preferably together with a timestamp and preferably together with a sensor assembly identifier and a metric of signal strength which provides information relating to relative location of the device in the venue.

Preferably, the face of the customer is photographed by one or more cameras 130, inside the department store.

Turning now additionally to FIG. 1C, which shows the venue of FIG. 1A at a time approximately 10 minutes later than that shown in FIG. 1B, it is seen that the customer, who is using Bluetooth earpiece B3, is in the clothing department. At this time devices B1 and B3 continue to transmit their signals.

In accordance with a preferred embodiment of the present invention, multiple sensor assemblies 110, at least some of which are typically different from the sensor assemblies which received the signals from devices B1 and B3 as seen in FIG. 1B, receive all of the above UDIRF signals from devices B1 and B3 at various signal strengths which are a function of the location of the devices relative to the sensor assemblies 110. The sensor assemblies 110 transmit to server 120 at least the unique device identifiers, which form part of the UDIRF signals preferably together with a timestamp and preferably together with a sensor assembly identifier and a metric of signal strength which provides information relating to the location of the device in the venue.

Figure 1D:
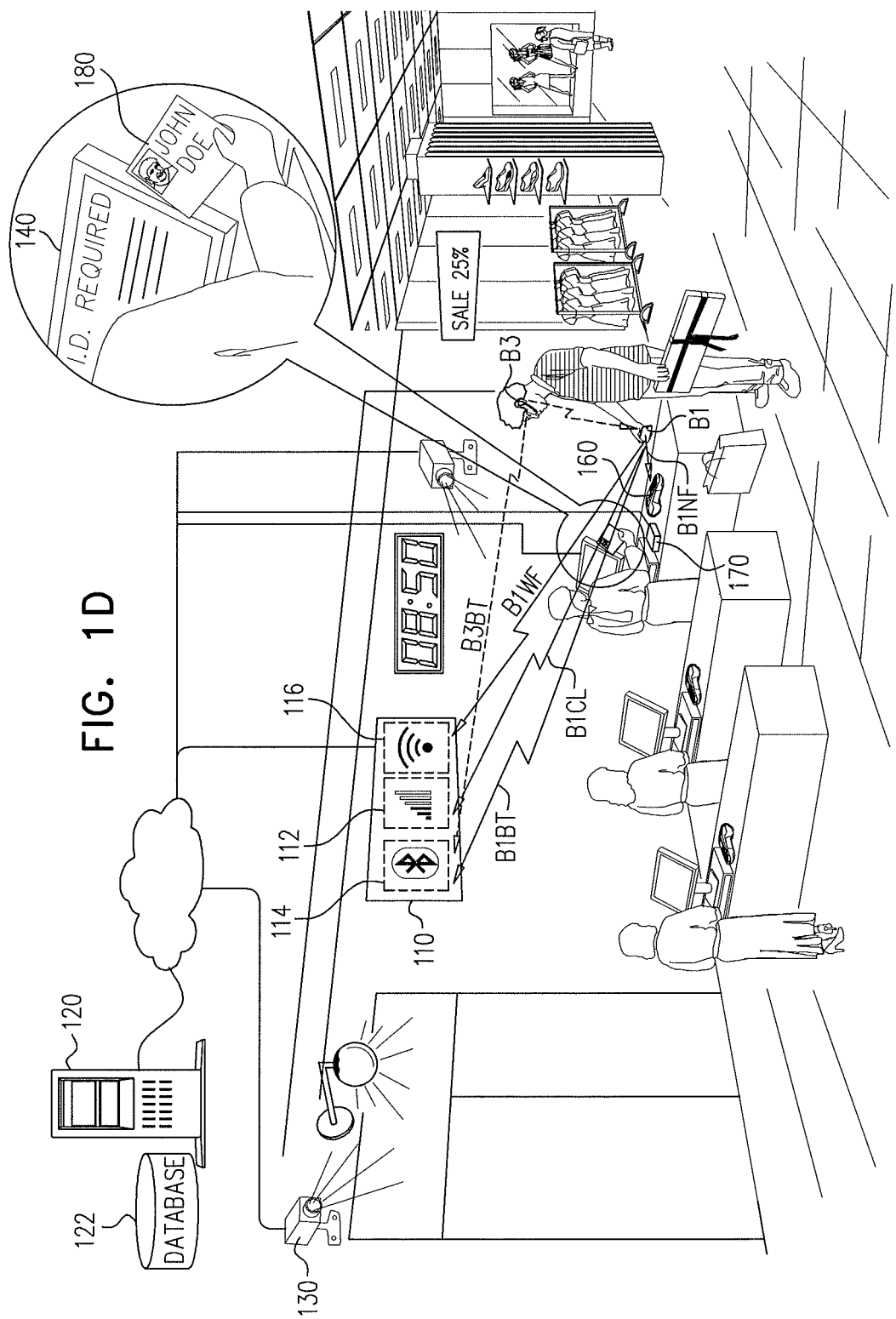

Turning now additionally to FIG. 1D, which shows the venue of FIG. 1A at a time approximately 20 minutes later than that shown in FIG. 1C, it is seen that the customer is standing adjacent point of sale terminal 140 and is paying with his smartphone using NFC at an NFC terminal 160 coupled to point of sale terminal 140. At this time devices B1 and B3 continue to transmit their respective signals and, in addition, device B1 is transmitting an NFC signal, here designated B1NF. The NFC signal, which typically has a very short range of approximately 4 cm, is also received by a NFC sensor 170 which preferably outputs to server 120. Alternatively, NFC sensor 170 and NFC terminal 160 may be combined.

It is seen that typically at a first purchase by the customer, the sales clerk is checking the customer's picture ID 180.

Figure 1E:
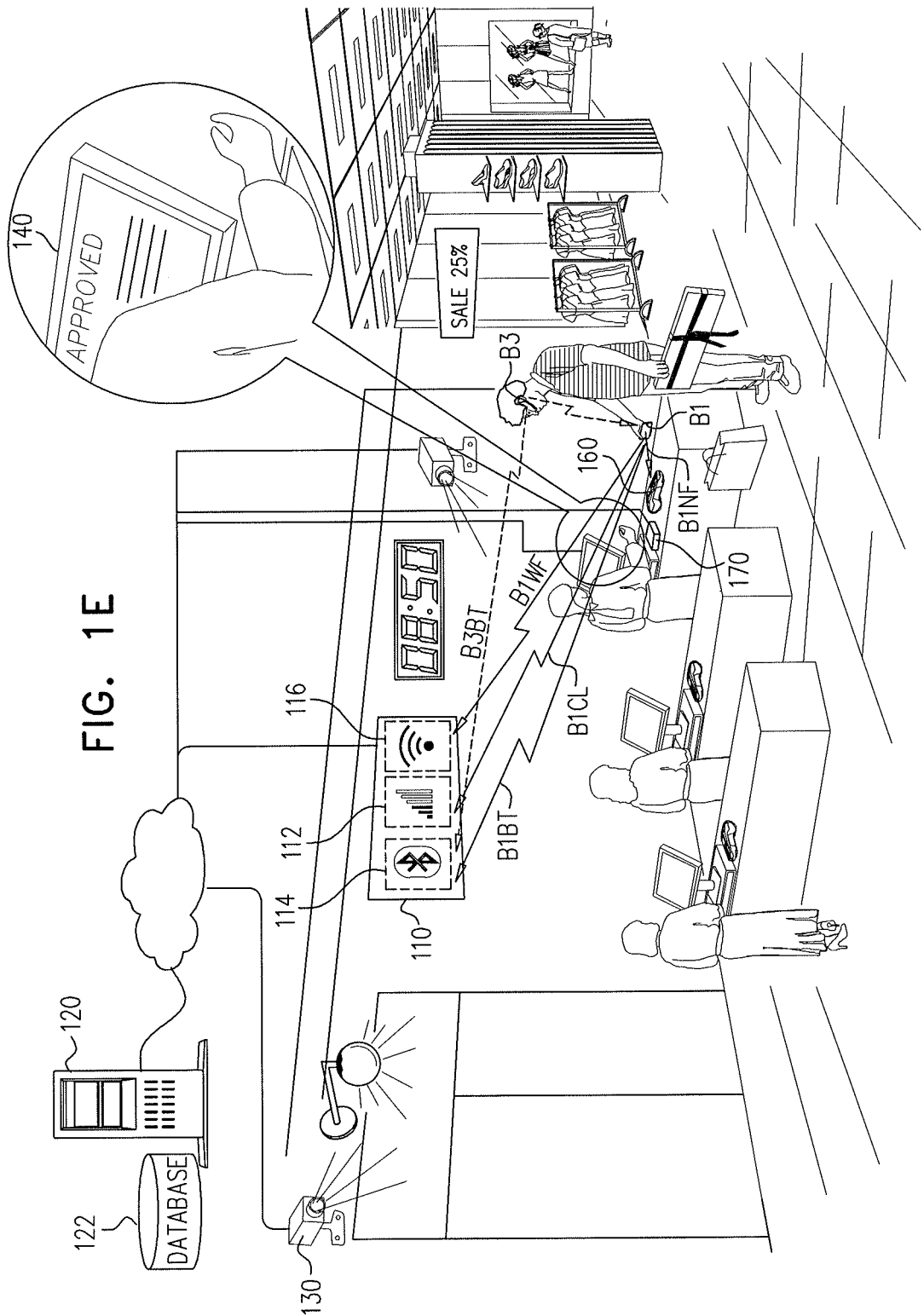

Turning now additionally to FIG. 1E, which shows the venue of FIG. 1D at a time approximately one week later than that shown in FIG. 1D, it is seen that the customer is standing adjacent point of sale terminal 140 and is paying with his smartphone using NFC at an NFC terminal 160 coupled to point of sale terminal 140. At this time devices B1 and B3 continue to transmit their respective signals and, in addition, device B1 is transmitting an NFC signal, here designated B1NF.

It is seen that typically at a later purchase by the customer, the sales clerk no longer checks the customer's picture ID 180, since he is identified to the point of sale terminal 140 by the system of the present invention based on a similarity of at least some of the signals emitted by his devices in one or more previous transactions and the signals emitted by his devices at the time of the current transaction.

It is a particular feature of an embodiment of the present invention that server 120 is able to provide a unique multiple RF signal-based identifier corresponding to the signals output by some or all of devices B1, B2 and B3 based on some or all of the sensed signals B1BT, B1WF, B1CL, B1NF, B2BT and B3BT at least in view of the time correspondence between the timestamps at which the signals were sensed at various ones of sensor assemblies 110 at the venue.

Preferably, generation of a unique multiple RF signal-based identifier employs a signal origin ascertaining subsystem, which ascertains to a given confidence level, which signals are emitted from which device or devices. The signal origin ascertaining subsystem preferably operates using one or more of the following types of information inputs:

Signal simultaneity;

Sequential MAC or other device identifiers; and

Similar manufacturer identifiers.

When Bluetooth and/or WIFI signals are sensed, the sequential relationship of their MAC addresses may also be useful in providing a unique multiple RF signal-based identifier having a high confidence level, by associating different types of signals transmitted by a single device.

It is appreciated that the MAC addresses may also provide additional useful information, such as the name or identity of the manufacturer of a device. Such information may provide an indication of the type of the device, such as a vehicle installed Bluetooth speakerphone.

In a crowded environment, where a multiplicity of devices and their respective signals are sensed by sensor assemblies 110, the location of the devices, as indicated by their signal strengths, may also be useful in providing a unique multiple RF signal-based identifier having a high confidence level.

A typical unique multiple RF signal-based identifier may be visualized as all or part of the following:

MACB1BT/MACB1WF/UDIDB1CL/MACB2BT/
MACB3BT/RFID OF B1NF

A unique multiple RF signal-based individual identifier having a high confidence level may also be provided based on some or all of the foregoing information in addition to one or more photographs of the individual in whose possession the devices are present.

A typical unique multiple RF signal-based individual identifier may be visualized as all or part of the following:
MACB1BT/MACB1WF/UDIDB1CL/MACB2BT/
MACB3BT/RFID OF B1NF/CUSTOMER PHOTOGRAPH A unique multiple RF signal-based individual identifier and transaction-based identifier having a high confidence level may also be provided based on some or all of the foregoing information in addition to transaction information, such as payment card information, obtained from the point of sale terminal 140 and or the NFC terminal 160.

A typical unique multiple RF signal-based transaction identifier may be visualized as all or part of the following:
MACB1BT/MACB1WF/UDIDB1CL/MACB2BT/
MACB3BT/RFID OF B1NF/PAYMENT CARD NUMBER A typical unique multiple RF signal-based, transaction-based individual identifier may be visualized as all or part of the following:
MACB1BT/MACB1WF/UDIDB1CL/MACB2BT/
MACB3BT/RFID OF B1NF/CUSTOMER PHOTOGRAPH/PAYMENT CARD NUMBER It is appreciated that in the above-described embodiment of the present invention, the degree of confidence realized by the system for any unique multiple RF signal-based identifier, unique multiple RF signal-based individual identifier and unique multiple RF signal-based transaction identifier is typically a function of the number of occurrences in which multiple signals are simultaneously received by at least one sensor assembly 110. Accordingly, typically the degree of confidence of any given unique multiple RF signal-based identifier, unique multiple RF signal-based individual identifier and unique multiple RF signal-based transaction identifier increases over time.

Thus, for example, if only two signals, such as, for example, B1BT and B1CL, are sensed at the same time at less than 20 occurrences, a relatively low degree of confidence is realized for a given unique multiple RF signal-based identifier, unique multiple RF signal-based individual identifier and unique multiple RF signal-based transaction identifier and if, for example, the two signals, such as, for example, B1BT and B1CL, are sensed at the same time in at least 20 occurrences a relatively high degree of confidence is realized for a given unique multiple RF signal-based identifier, unique multiple RF signal-based individual identifier and unique multiple RF signal-based transaction identifier.

In the embodiment of FIGS. 1A-1D, multiple occurrences in which multiple signals are simultaneous received by at least one sensor assembly 110 take place during a single visit of a customer to a venue, as the customer walks through various different locations at the venue at different times. In the example illustrated in FIG. 1E, a result of having associated a unique multiple RF signal-based identifier associated with an individual is realized in that the customer's picture ID is not requested in the transaction.

Reference is now made to FIGS. 2A-2E, which are simplified illustrations of the operation of a computerized system for associating RF signals constructed and operative in accordance with another preferred embodiment of the present invention.

As seen in FIGS. 2A-2E, in a typical scenario a plurality of individuals are present at a venue, such as a drive up window of a fast food restaurant. Two individuals are in a first vehicle and an additional individual is in a second vehicle. Each individual has in that individual's possession at least one RF communications device 200. Each vehicle includes at least one RF communication device 200, such as a Bluetooth speakerphone.

Each RF communications device 200 outputs at least one unique, device identifying RF (UDIRF) signal. A typical RF communications device 200 may output multiple UDIRF signals, each typically in a different RF frequency band.

A plurality of sensor assemblies 210 are located at the venue and are configured to receive the UDIRF signals from the various RF communications devices 200 at the venue. For example, each sensor assembly 210 may include a cellular signal receiver 212, a Bluetooth signal receiver 214 and a WIFI signal receiver 216. Outputs of the one or more sensor assemblies 210 are preferably supplied via any suitable communication network to a server 220, having associated therewith at least one database 222. Preferably, at least one camera 230 is provided at the venue to photograph individuals. Outputs of camera 230 are also preferably supplied via any suitable communication network to server 220. A point of sale terminal 240 is preferably present at the venue and an output thereof may be supplied via any suitable communication network to server 220.

Figure 2A:
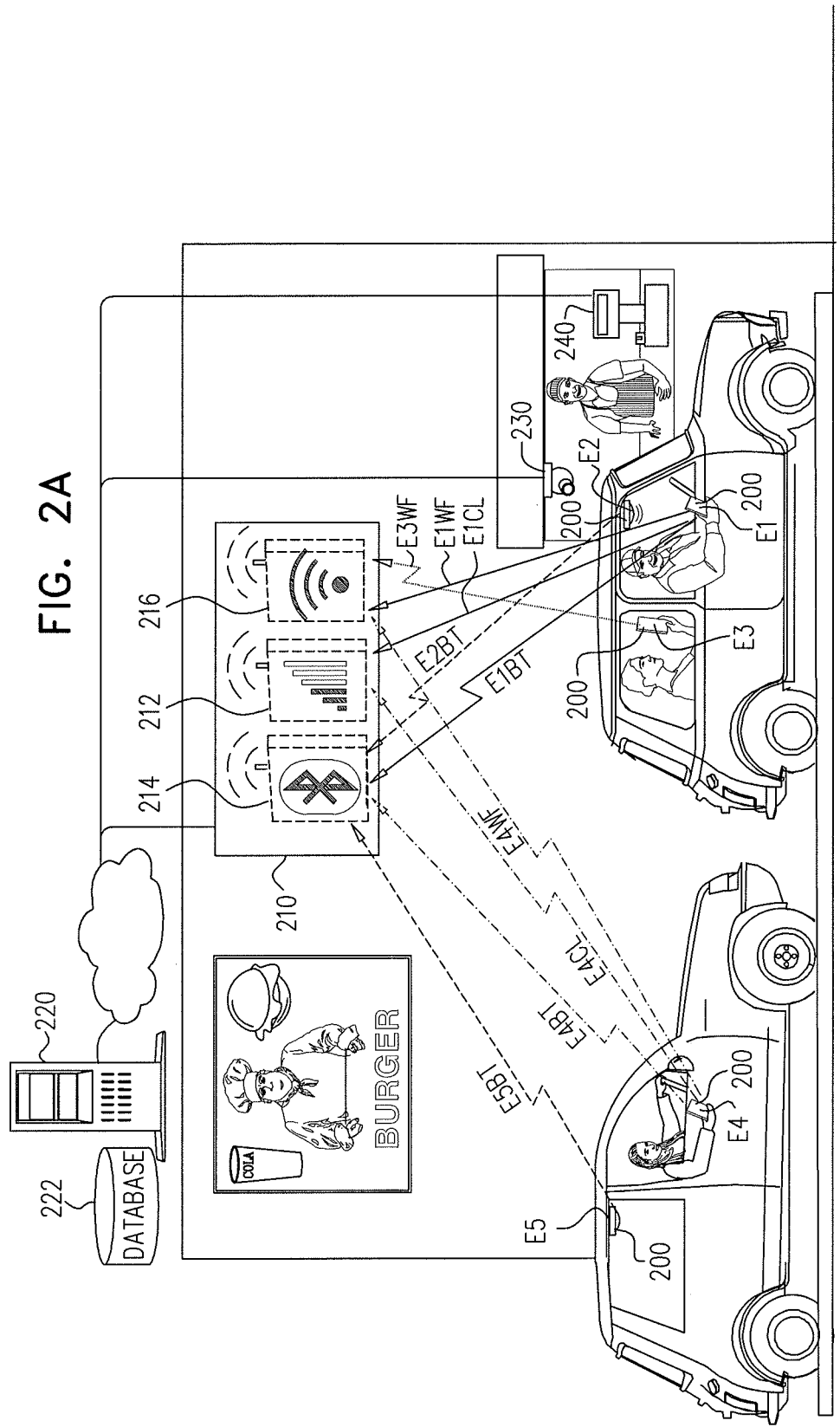

Turning initially to FIG. 2A, five RF communications devices 200 are shown to be present in the venue at a given time. A first device, here a cellular telephone in the hand of a customer in the first vehicle, is labeled E1 and typically outputs three UDIRF signals, typically a Bluetooth signal, a WIFI signal and a cellular telephone signal, here respectively designated as E1BT, E1WF and E1CL. A second device, which is typically a Bluetooth speaker phone in the first vehicle, is labeled E2 and typically outputs one UDIRF signal, a Bluetooth signal, here designated as E2BT.

A third device, here shown in the hand of another customer in the first vehicle, is labeled E3 and outputs a single UDIRF signal, typically a WIFI signal, here designated as E3WF. A fourth device, here a cellular telephone in the hand of an individual in the second vehicle, is labeled E4 and outputs three UDIRF signals, typically a cellular telephone signal, a WIFI signal and a Bluetooth signal, here respectively designated as E4CL, E4WF and E4BT. A fifth device, a Bluetooth speakerphone in the second vehicle, is labeled E5 and outputs a single UDIRF signal, here a Bluetooth signal designated as E5BT.

In accordance with a preferred embodiment of the present invention, sensor assembly 210 receives all of the above UDIRF signals from devices E1-E5 and transmits to server 220 at least the device identifiers which form part of the UDIRF signals preferably together with a timestamp and preferably together with a metric of signal strength which provides information relating to relative location of the device in the venue. If multiple sensor assemblies 210 are provided, triangulation may be employed to enhance location information. The timestamp may be provided by one or more of RF communications devices 200, sensor assembly 210 and server 220.

Figure 2B:
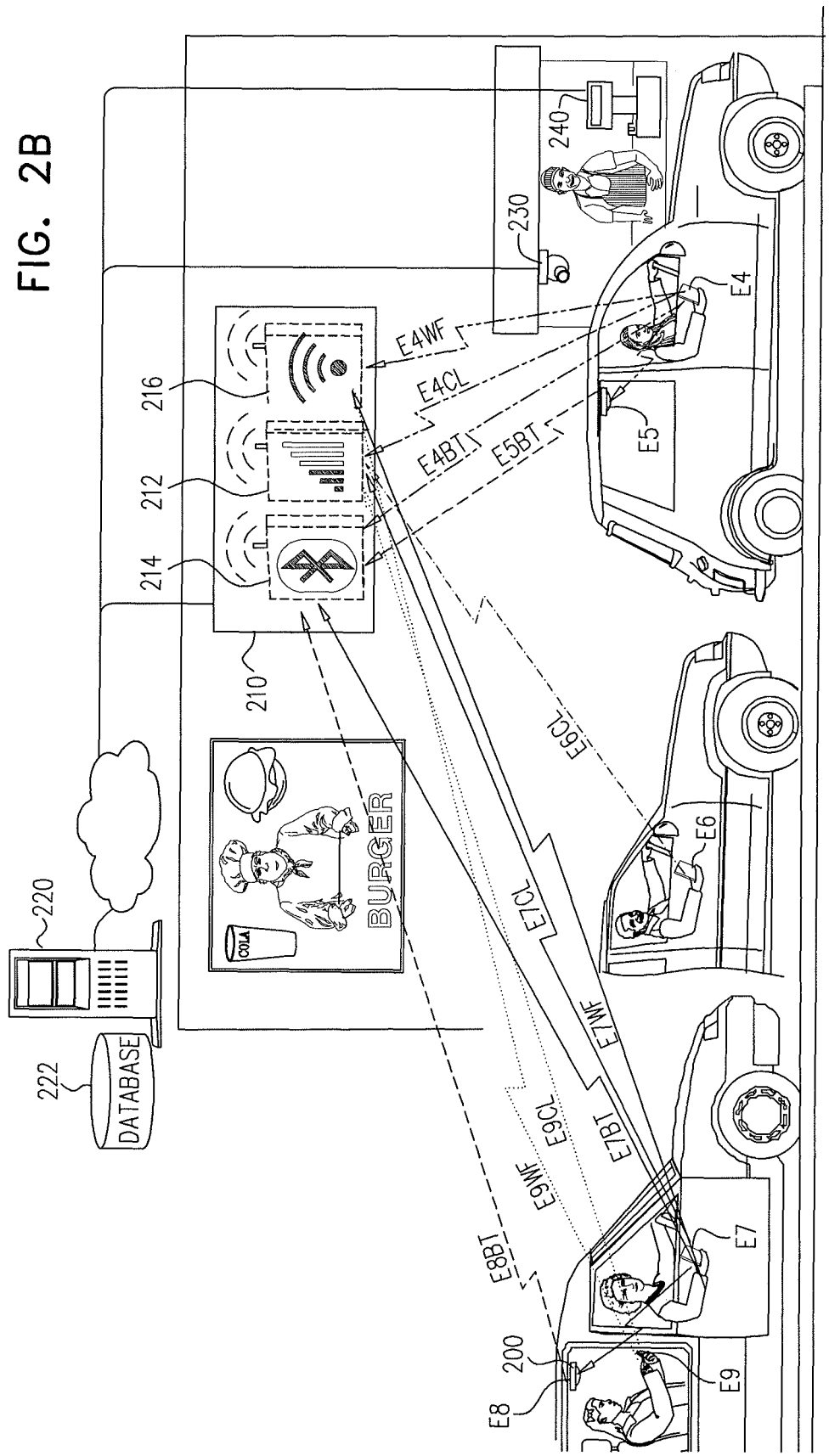

Turning now additionally to FIG. 2B, which shows the venue of FIG. 2A at a time approximately 3 minutes later than that shown in FIG. 2A, it is seen that the first vehicle is no longer present at the venue and accordingly devices E1, E2 and E3 are no longer present in the venue. At this time device E4 and device E5 continue to transmit their respective signals.

It is seen that the second vehicle, in which are located devices E4 and E5, has moved forward and closer to sensor assembly 210. An additional device, here designated E6, typically a cellular telephone, is held in the hand of a customer located in a newly arrived vehicle. A further three additional devices, here respectively designated as E7, E8 and E9 are located in another newly arrived vehicle. Device E7 is typically a smartphone held in the hand of a customer, device E8 is typically a Bluetooth speakerphone and device E9 is typically a cellular telephone held in the hand of another customer in the same vehicle.

Device E6 typically outputs one UDIRF signal, typically a cellular telephone signal, here designated as E6CL. Device E7 typically outputs three UDIRF signals, a Bluetooth signal, here designated as E7BT, a cellular telephone signal, here designated as E7CL, and a WIFI signal, here designated as E7WF. Device E8 typically outputs one UDIRF signal, typically a Bluetooth signal, here designated as E8BT. Device E9 typically outputs two UDIRF signals, a cellular telephone signal, here designated as E9CL, and a WIFI signal, here designated as E9WF.

Turning now additionally to FIG. 2C, which shows the venue of FIG. 2A at a time approximately 4 minutes later than that shown in FIG. 2B, it is seen that the second vehicle in FIG. 2A, which is the first vehicle in FIG. 2B, is no longer present at the venue and accordingly devices E4 and E5 are no longer present at the venue. At this time devices E6, E7, E8 and E9 continue to transmit their respective signals.

Figure 2D:
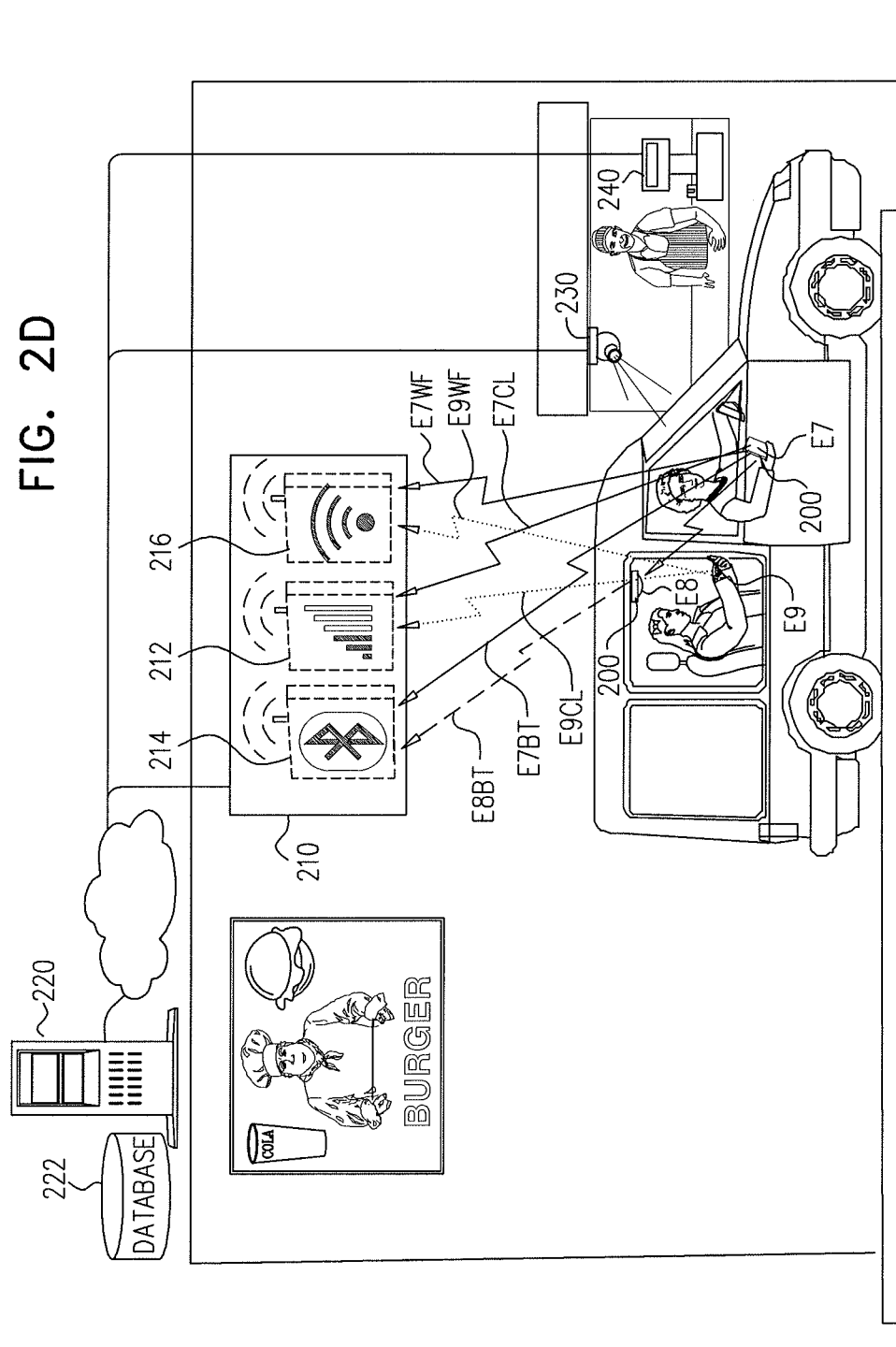

Turning now additionally to FIG. 2D, which shows the venue of FIG. 2A at a time approximately 4 minutes later than that shown in FIG. 2C, it is seen that the second vehicle in FIG. 2B, which is the first vehicle in FIG. 2C, is no longer present at the venue and accordingly device E6 is no longer present at the venue. At this time devices E7, E8 and E9 continue to transmit their respective signals.

Figure 2E:
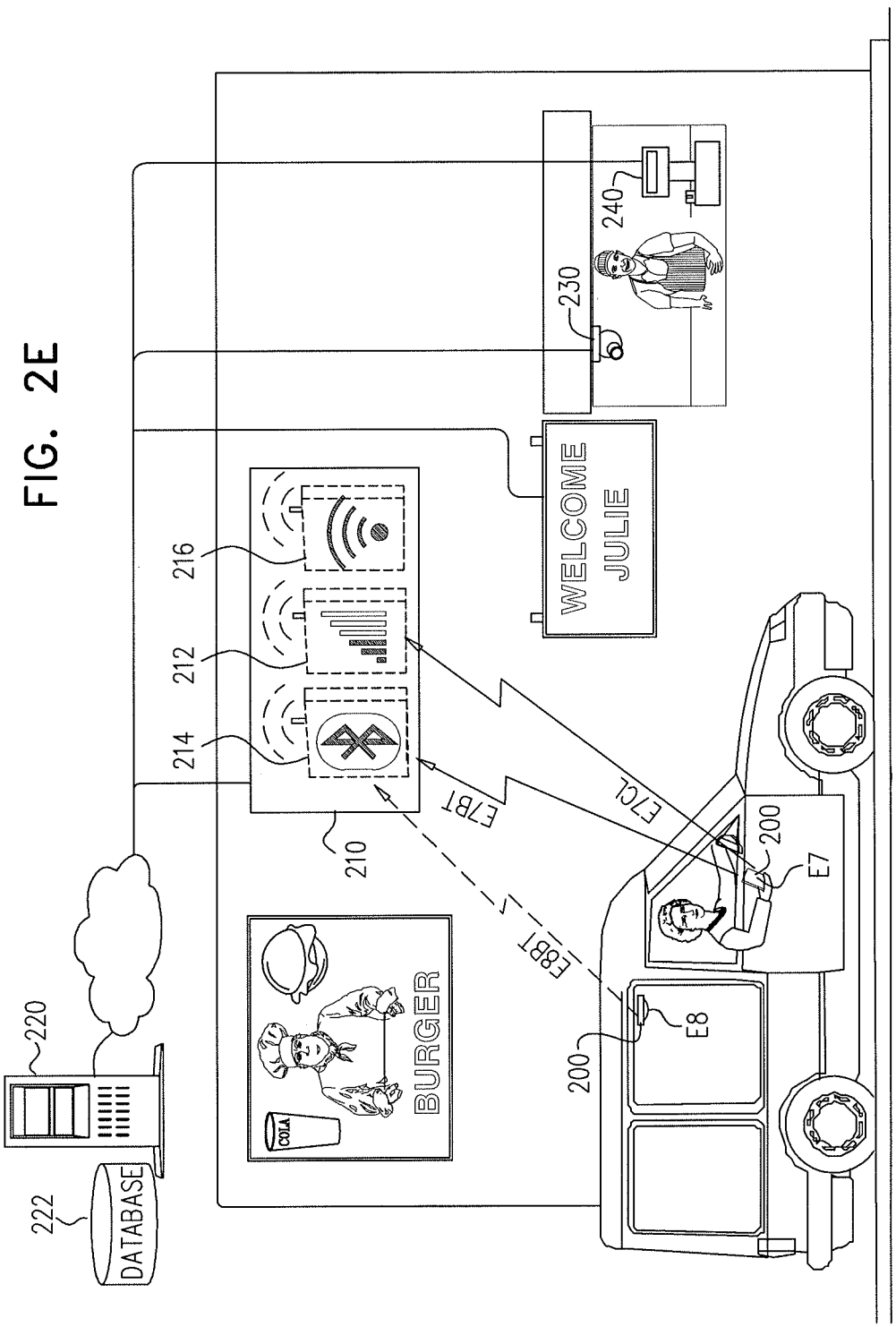

Turning now additionally to FIG. 2E, which shows the venue of FIG. 2A at a time a few days or weeks later than that shown in FIG. 2D, it is seen that the vehicle in FIG. 2D has returned to the venue, but this time the E7WF, E9WF and E9CL signals are no longer being transmitted. It is seen that nevertheless, the system recognizes the customer based on the presence of signals E7BT, E7CL and E8BT and based on this recognition, displays a welcome message to customer. In the illustrated embodiment, the system is aware of the name of the customer by virtue of transaction data and/or camera output data, to which may be added ancillary data, such as data from social networks. Accordingly, the welcome message greets the customer by name.

It is a particular feature of an embodiment of the present invention that server 220 is able to provide a unique system identifier corresponding to the signals output by devices E4 and E5 based on the sensed signals E4CL, E4BT and E5BT in view of the time correspondence between the timestamps at which the signals were present at the venue.

When Bluetooth and/or WIFI signals are sensed, the sequential relationship of their MAC addresses may also be useful in providing a unique multiple RF signal-based identifier having a high confidence level, by associating different types of signals transmitted by a single device. The lack of a sequential relationship between MAC addresses of Bluetooth and/or WIFI signals which are simultaneously received by sensor 210 may provide an indication that they are not being transmitted by a single device.

Accordingly, if the MAC addresses appearing in signals E7WF and E7BT are sequential, this provides an indication that they are all transmitted by the same device. Similarly, if the MAC addresses appearing in signals E7WF and E9BT are not sequential, this provides an indication that they are transmitted by different devices.

In a crowded environment, where a multiplicity of devices and their respective signals are sensed by sensor assemblies 210, the location of the devices, as indicated by their signal strengths, may also be useful in providing a unique multiple RF signal-based identifier having a high confidence level.

Based only on timestamps, a typical unique multiple RF signal-based identifier may be visualized as all or part of the following:

MACE1BT/MACE1WF/MACE2BT/UDIDE1CL/
MACE3WF having a relatively low initial confidence level. This low initial confidence level may be increased by multiple simultaneous sensing of this unique multiple RF signal-based identifier.

If, however, the sequential or non-sequential relationship between the MAC addresses is taken into account, an additional unique multiple RF signal-based identifier having a high confidence level, which is seen to be part of the foregoing unique multiple RF signal-based identifier initially having a low confidence level may be visualized as:

MACE1BT/MACE1WF.

This unique multiple RF signal-based identifier is known, by virtue of the sequential relationship of the MAC addresses, to represent a single device.

One or more unique multiple RF signal-based individual identifiers having a high confidence level may also be provided based on some or all of the foregoing information in addition to one or more photographs of the individual in whose possession the devices are present.

Accordingly, a unique multiple RF signal-based individual identifier may be visualized as all or part of the following:

MACE4BT/MACE4WF/MACE5BT/UDIDE4CL/
FACEPHOTO having an intermediate initial confidence level. This intermediate initial confidence level may be increased by multiple simultaneous sensing of this unique multiple RF signal-based individual identifier.

An additional unique multiple RF signal-based identifier MACE4BT/MACE4WF may similarly be enhanced to the following unique multiple RF signal-based individual identifier:

MACE4BT/MACE4WF/FACEPHOTO.

A unique multiple RF signal-based transaction-based individual identifier having a high confidence level may also be provided based on some or all of the foregoing information in addition to transaction information, such as payment card information, obtained from the point of sale terminal 240.

Where payment is made by a payment card via point of sale terminal 240, a typical unique multiple RF signal-based transaction identifier may be visualized as all or part of the following:

MACE4BT/MACE4WF/MACE5BT/UDIDE4CL/PAY-
MENT CARD NUMBER

A typical unique multiple RF signal-based, transaction-based individual identifier may be visualized as all or part of the following:

MACE4BT/MACE4WF/MACE5BT/UDIDE4CL/FACE
PHOTO/PAYMENT CARD NUMBER

It is appreciated that in the above-described embodiment of the present invention, the degree of confidence realized by the system for any unique multiple RF signal-based identifier, unique multiple RF signal-based individual identifier and transaction-based identifier is typically a function of the number of occurrences in which multiple signals are simultaneously received by at least one sensor assembly 210. Accordingly, typically the degree of confidence of any given unique multiple RF signal-based identifier, unique multiple RF signal-based individual identifier and unique multiple RF signal-based transaction identifier increases over time.

Thus, for example, if only two signals, such as, for example, E5BT and E4CL, are sensed at the same time at less than 20 occurrences a relatively low degree of confidence is realized for a given unique multiple RF signal-based identifier, unique multiple RF signal-based individual identifier and unique multiple RF signal-based transaction identifier and if, for example, the two signals, such as, for example, E5BT and E4CL, are sensed at the same time in at least 20 occurrences a relatively high degree of confidence is realized for a given unique multiple RF signal-based identifier, unique multiple RF signal-based individual identifier and unique multiple RF signal-based transaction identifier.

With particular reference to FIGS. 2D and 2E, it is seen that in FIG. 2D, a typical unique multiple RF signal-based individual identifier may be visualized as all or part of the following:

MACE7BT/MACE7WF/MACE8BT/MACE9WF/ UDIDE7CL/UDIDE7CL/FACEPHOTO

It is appreciated that the above-described embodiment of the present invention, the degree of confidence realized by the system for any unique multiple RF signal-based identifier, unique multiple RF signal-based individual identifier and unique multiple RF signal-based transaction identifier is typically a function of the number of occurrences in which multiple signals are simultaneously received by at least one sensor assembly 210. Accordingly, typically the degree of confidence of any given unique multiple RF signal-based identifier, unique multiple RF signal-based individual identifier increases over time.

Thus, for example as seen in FIG. 2E, if only three signals, such as, for example E7BT, E7CL and E8BT are sensed at the same time, even before the customer is photographed again the system employs an identifier which is only part of the identifier:

MACE7BT/MACE7WF/MACE8BT/MACE9WF/ UDIDE7CL/FACEPHOTO namely:

MACE7BT/MACE8BT/UDIDE7CL and employs this identifier to recognize the customer.

Reference is now made to FIGS. 3A-3D, which are simplified illustrations of the operation of a computerized system for associating RF signals constructed and operative in accordance with yet another preferred embodiment of the present invention.

As seen in FIGS. 3A-3D, in a typical scenario a plurality of individuals are present in a venue, such as a coffee shop. Each individual has in that individual's possession at least one RF communications device 300.

Each RF communications device 300 outputs at least one unique, device identifying RF (UDIRF) signal. A typical RF communications device 300 may output multiple UDIRF signals, each typically in a different RF frequency band.

Preferably, each UDIRF signal includes at least some of the above-described device identifiers.

One or more sensor assemblies 310 are located at the venue and are configured to receive the UDIRF signals from the various RF communications devices 300 at the venue. For example, sensor assembly 310 may include a cellular signal receiver 312, a Bluetooth signal receiver 314 and a WIFI signal receiver 316. Outputs of the one or more sensor assemblies 310 are preferably supplied via any suitable communication network to a server 320, having associated therewith at least one database 322. Optionally, one or more cameras 330 may be provided in the venue to photograph individuals. Outputs of cameras 330 are also preferably supplied via any suitable communication network to server 320. A point of sale terminal 340 may be present in the venue and an output thereof may be supplied via any suitable communication network to server 320.

Figure 3A:
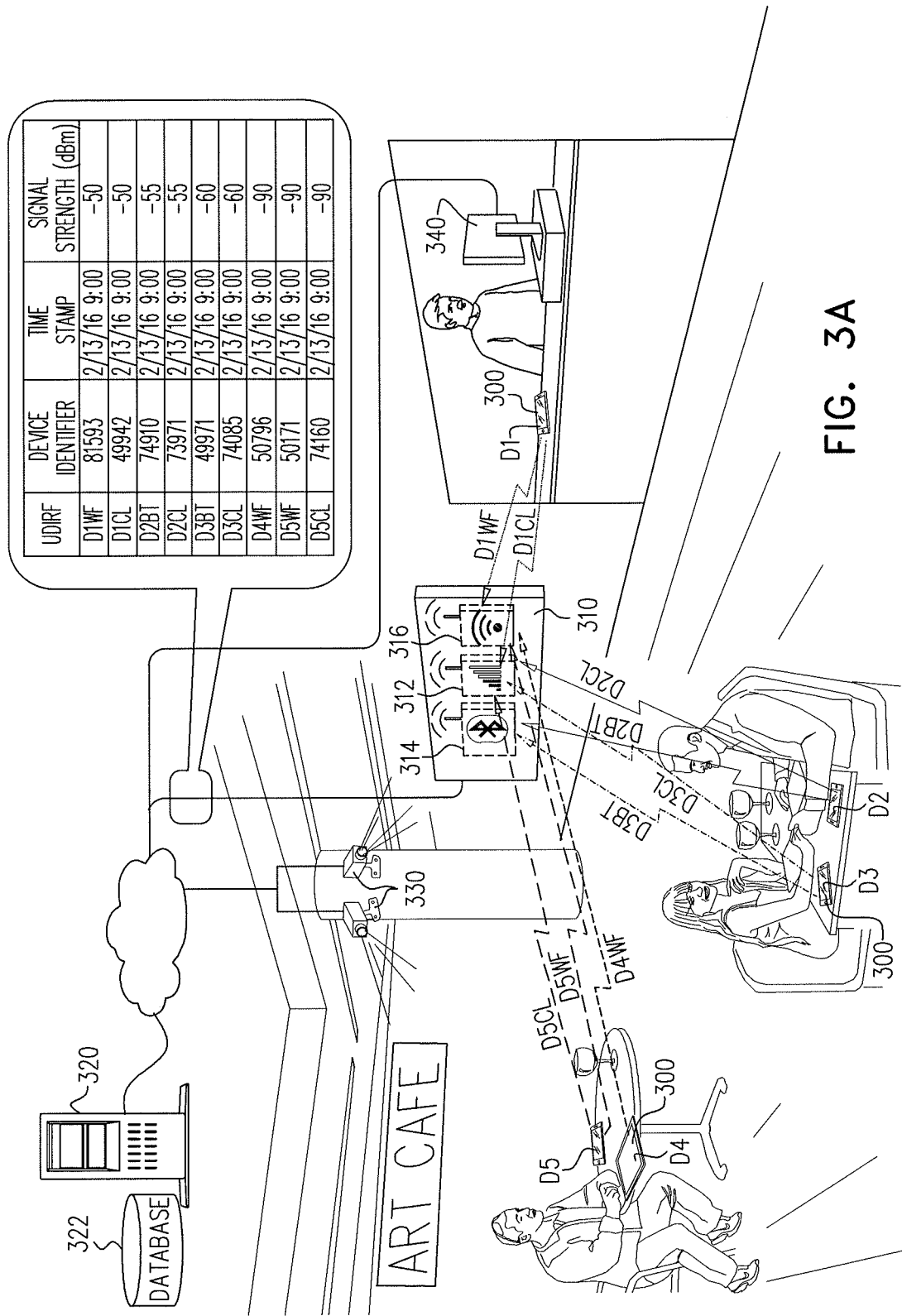
FIGS. 3A-3D are simplified illustrations of the operation of a computerized system for associating RF signals constructed and operative in accordance with yet another preferred embodiment of the present invention.

Turning initially to FIG. 3A, it is seen that five RF communications devices 300 are present in the venue at a given time. A first device, here a cellular telephone on a counter next to a cashier, is labeled D1 and typically outputs two UDIRF signals, typically a WIFI signal and a cellular telephone signal, here designated as D1WF and D1CL. A second device, here shown lying on a table, is labeled D2 and typically outputs two UDIRF signals, typically a Bluetooth signal and a cellular telephone signal, here designated as D2BT and D2CL. A third device, here shown lying on the same table as device D2, is labeled D3 and outputs two UDIRF signals, typically a Bluetooth signal and a cellular telephone signal, here designated as D3BT and D3CL.

A fourth device, here a tablet placed on a different table, is labeled D4 and outputs one UDIRF signal, typically a WIFI signal, here designated as D4WF. A fifth device, here shown lying on the same table as device D4, is labeled D5 and outputs two UDIRF signals, typically a WIFI signal and a cellular telephone signal, here designated as D5WF and D5CL.

In accordance with a preferred embodiment of the present invention, sensor assembly 310 receives all of the above UDIRF signals from devices D1-D5 and transmits to server 320 at least the device identifiers which form part of the UDIRF signals preferably together with a timestamp and preferably together with a metric of signal strength which provides information relating to relative location of the device in the venue. If multiple sensor assemblies 310 are provided, triangulation may be employed to enhance location information. The timestamp may be provided by one or more of RF communications devices 300, sensor assembly 310 and server 320.

Dialing, routing, addressing and signaling (DRAS) data of the various UDIRF signals and their signal strengths sensed by sensor assembly 310 are listed in a simplified, illustrative table in FIG. 3A. It is appreciated that the content of the UDIRF signals is not monitored or stored and is not used in the system and method of any of the embodiments of the present invention.

Figure 3B:
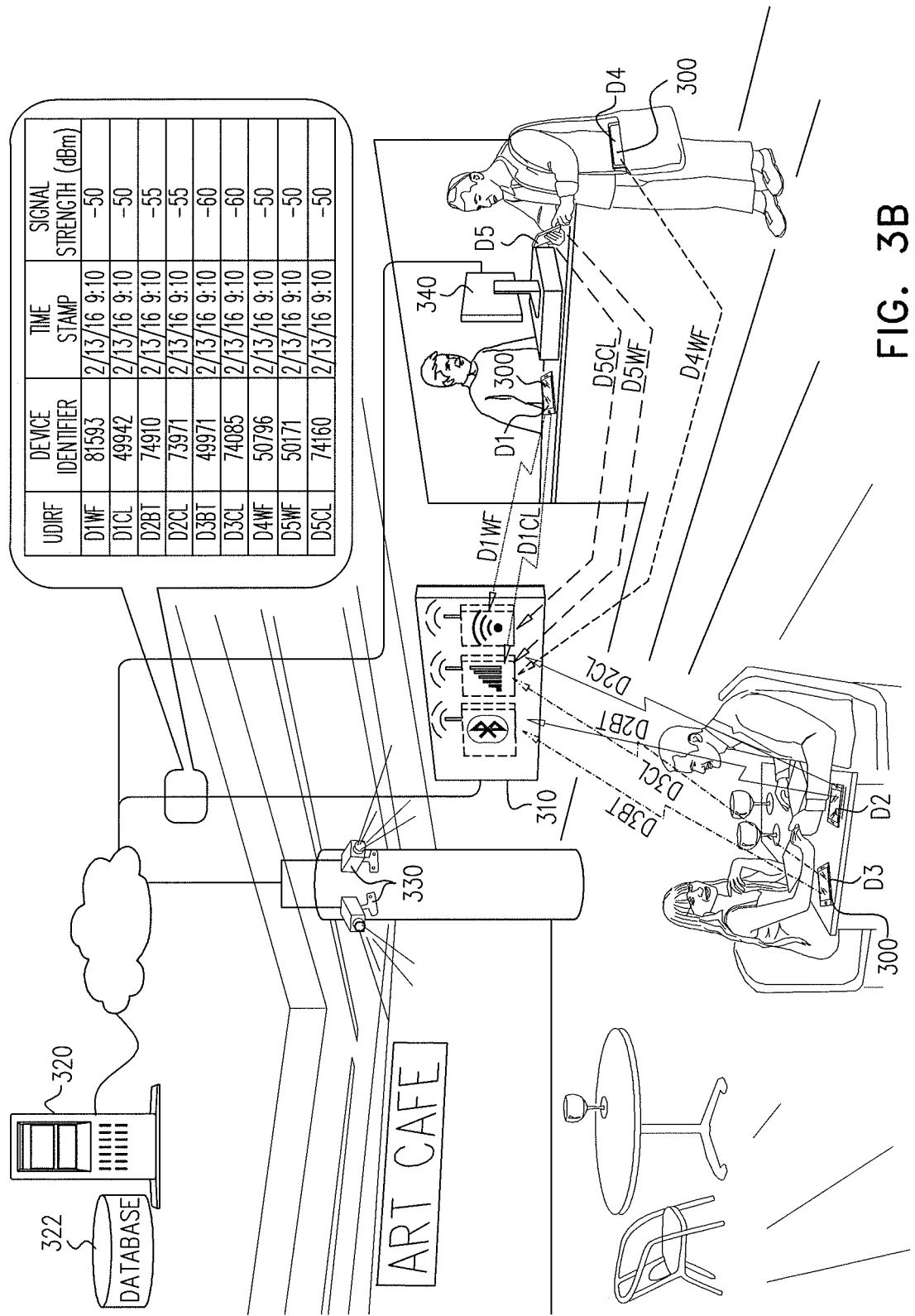

Turning now additionally to FIG. 3B, which shows the venue of FIG. 3A at a time approximately 10 minutes later than that shown in FIG. 3A, it is seen that one of the individuals, having devices D4 and D5 in his possession, is now standing in front of the point of sale device 340. At this time device D4 and device D5 continue to transmit their respective signals.

DRAS data of the various UDIRF signals and their signal strengths sensed by sensor assembly 310 are listed in a simplified, illustrative table in FIG. 3B. It is seen that the signal strengths of signals transmitted by devices D4 and D5 have increased, since the person holding those devices moved closer to the sensor assembly 310.

Figure 3C:
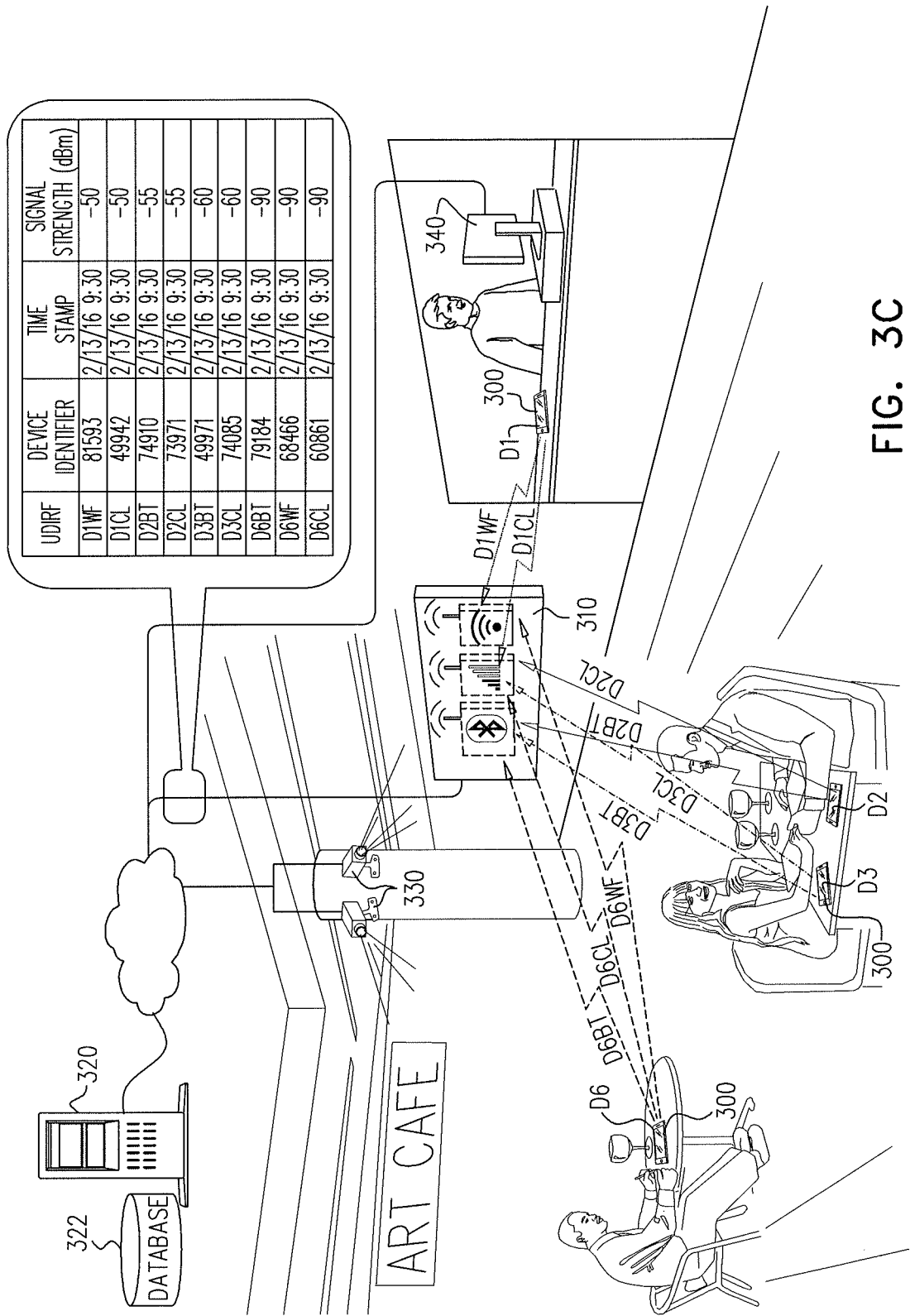

Turning now additionally to FIG. 3C, which shows the venue of FIG. 3A at a time approximately 20 minutes later than that shown in FIG. 3B, it is seen that the individual having in his possession devices D4 and D5 is no longer at the venue and a different person, having in his possession an RF communications device 300, such as a smartphone, here designated D6, is now present in the venue. At this time device D6 is transmitting WIFI, Bluetooth and cellular telephone signals, here respectively designated D6WF, D6BT and D6CL.

DRAS data of the various UDIRF signals and their signal strengths sensed by sensor assembly 310 are listed in a simplified, illustrative table in FIG. 3C. It is seen that no signals from devices D4 and D5 are being sensed by sensor assembly 310 and that signals from device D6 are being sensed.

Figure 3D:
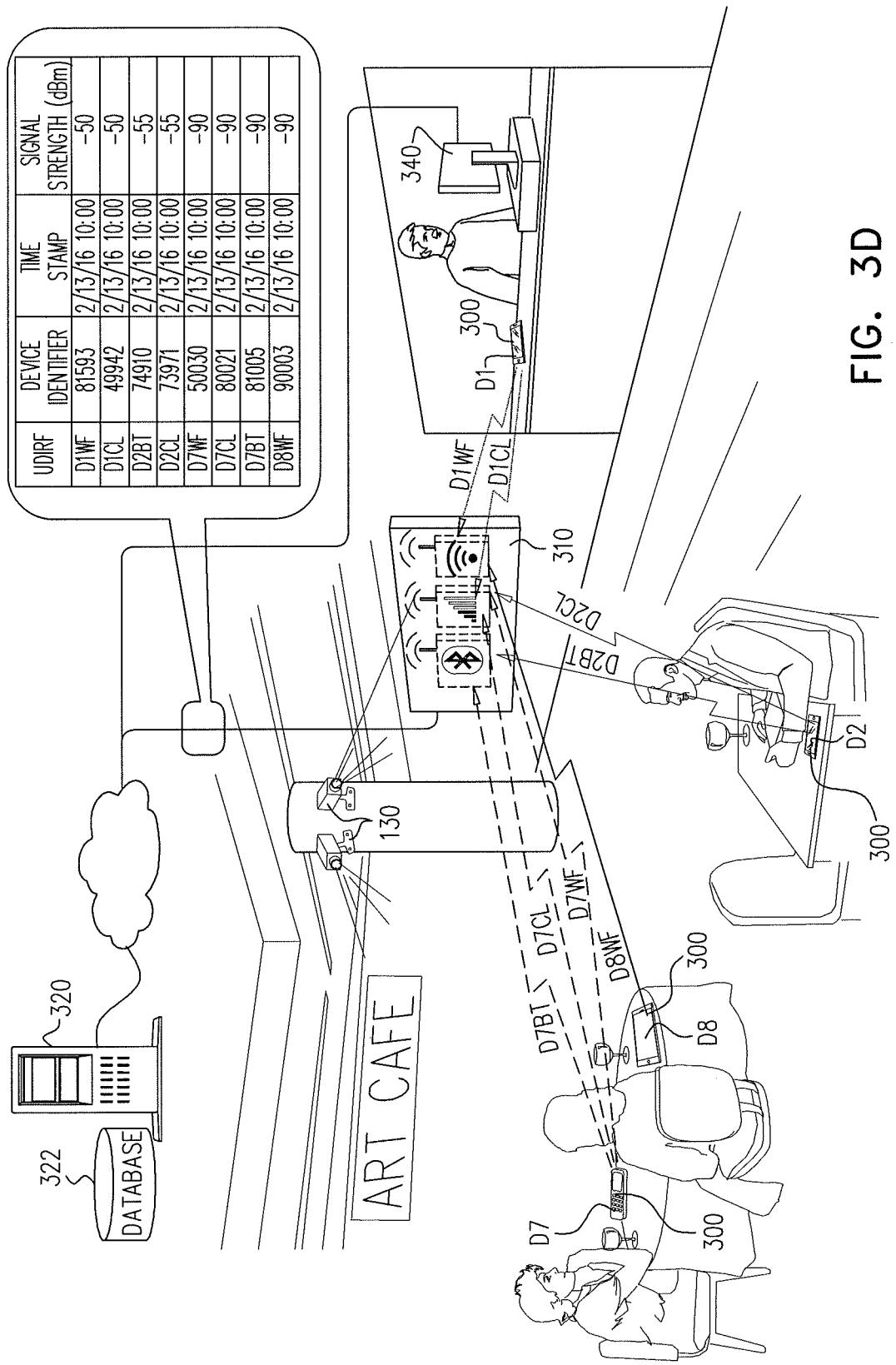

Turning now additionally to FIG. 3D, which shows the venue of FIG. 3A at a time approximately one day and 30 minutes later than that shown in FIG. 3C, it is seen that devices D1 and D2 are at the venue. Device D1 typically outputs signals D1WF and D1CL and device D2 typically outputs signals D2BT and D2CL. Two additional persons, having in their possession respective RF communications devices 300, such as a smartphone, here designated D7, and a tablet, here designated D8, are now present in the venue. At this time, device D7 is transmitting WIFI, Bluetooth and cellular telephone signals, here respectively designated D7WF, D7BT and D7CL and device D8 is transmitting WIFI signals, here designated D8WF. DRAS data of the various UDIRF signals and their signal strengths sensed by sensor assembly 310 are listed in a simplified, illustrative table in FIG. 3D.

It is a particular feature of an embodiment of the present invention that server 320 is able to provide a unique multiple RF signal-based identifier corresponding to the signals output by D6 based on the sensed signals D6WF, D6BT and D6CL in view of the time correspondence between the timestamps at which the signals were present at the venue.

It is also a particular feature of an embodiment of the present invention that server 320 is able to provide a unique multiple RF signal-based identifier corresponding to the signals output by devices D4 and D5 based on the sensed signals D4WF, D5WF and D5CL in view of the time correspondence between the timestamps at which the signals were present at the venue.

It is additionally a particular feature of an embodiment of the present invention that server 320 is able to provide a unique multiple RF signal-based identifier corresponding to the signals output by devices D4 and D5 based on the sensed signals D4WF, D5WF and D5CL in view of the time correspondence between the timestamps at which the signals were present at the venue and further in view of the relative signal strengths of the sensed WIFI signals at different times.

When Bluetooth and/or WIFI signals are sensed, the presence or absence of sequential relationship of sensed MAC addresses may also be useful in providing a unique multiple RF signal-based identifier having a high confidence level, by associating different types of signals transmitted by a single device. The lack of a sequential relationship between MAC addresses of Bluetooth and/or WIFI signals which are simultaneously received by sensor 310 may provide an indication that they are not being transmitted by a single device.

Accordingly, if the MAC addresses appearing in signals D6WF and D6BT are sequential, this provides an indication that they are all transmitted by the same device. Similarly, if the MAC addresses appearing in signals D1WF and D2BT are not sequential, this provides an indication that they are transmitted by different devices.

In a crowded environment, where a multiplicity of devices and their respective signals are sensed by sensor assemblies 310, the location of the devices, as indicated by their signal strengths, may also be useful in providing a unique multiple RF signal-based identifier having a high confidence level.

Based only on timestamps, a typical unique multiple RF signal-based identifier may be visualized as all or part of the following:

MACD4WF/UDIDD5CL/MACD5WF having a relatively low initial confidence level. This low initial confidence level may be increased by multiple simultaneous sensing of this unique multiple RF signal-based identifier.

One or more unique multiple RF signal-based individual identifiers having a high confidence level may also be provided based on some or all of the foregoing information in addition to one or more photographs of the individual in whose possession the devices are present.

Accordingly, a unique multiple RF signal-based individual identifier may be visualized as all or part of the following:

MACD4WF/UDIDD5CL/MACD5WF/FACEPHOTO having an intermediate initial confidence level. This intermediate initial confidence level may be increased by multiple simultaneous sensing of this unique multiple RF signal-based individual identifier.

A unique multiple RF signal-based transaction-based individual identifier having a high confidence level may also be provided based on some or all of the foregoing information in addition to transaction information, such as payment card information, obtained from the point of sale terminal 340.

Where payment is made by a payment card via point of sale terminal 340, a typical unique multiple RF signal-based transaction identifier may be visualized as all or part of the following:

MACD4WF/UDIDD5CL/MACD5WF/PAYMENT CARD NUMBER

A typical unique multiple RF signal-based, transaction-based individual identifier may be visualized as all or part of the following:

MACD4WF/UDIDD5CL/MACD5WF/FACE PHOTO/PAYMENT CARD NUMBER

It is appreciated that in the above-described embodiment of the present invention, the degree of confidence realized by the system for any unique multiple RF signal-based identifier, unique multiple RF signal-based individual identifier and unique multiple RF signal-based transaction identifier is typically a function of the number of occurrences in which multiple signals are simultaneously received by at least one sensor assembly 310. Accordingly, typically the degree of confidence of any given unique multiple RF signal-based identifier, unique multiple RF signal-based individual identifier and unique multiple RF signal-based transaction identifier increases over time.

Thus, for example, if only two signals, such as, for example D2BT and D2CL, are sensed at the same time at less than 20 occurrences a relatively low degree of confidence is realized for a given unique multiple RF signal-based identifier, unique multiple RF signal-based individual identifier and unique multiple RF signal-based transaction identifier and if, for example, the two signals, such as, for example, D2BT and D2CL, are sensed at the same time in at least 20 occurrences a relatively high degree of confidence is realized for a given unique multiple RF signal-based identifier, unique multiple RF signal-based individual identifier and unique multiple RF signal-based transaction identifier.

For example, it is seen that D2BT and D2CL are sensed together with other signals at two instances separated in time by days. This provides a good indication of a relatively high degree of confidence.

Figure 4A:
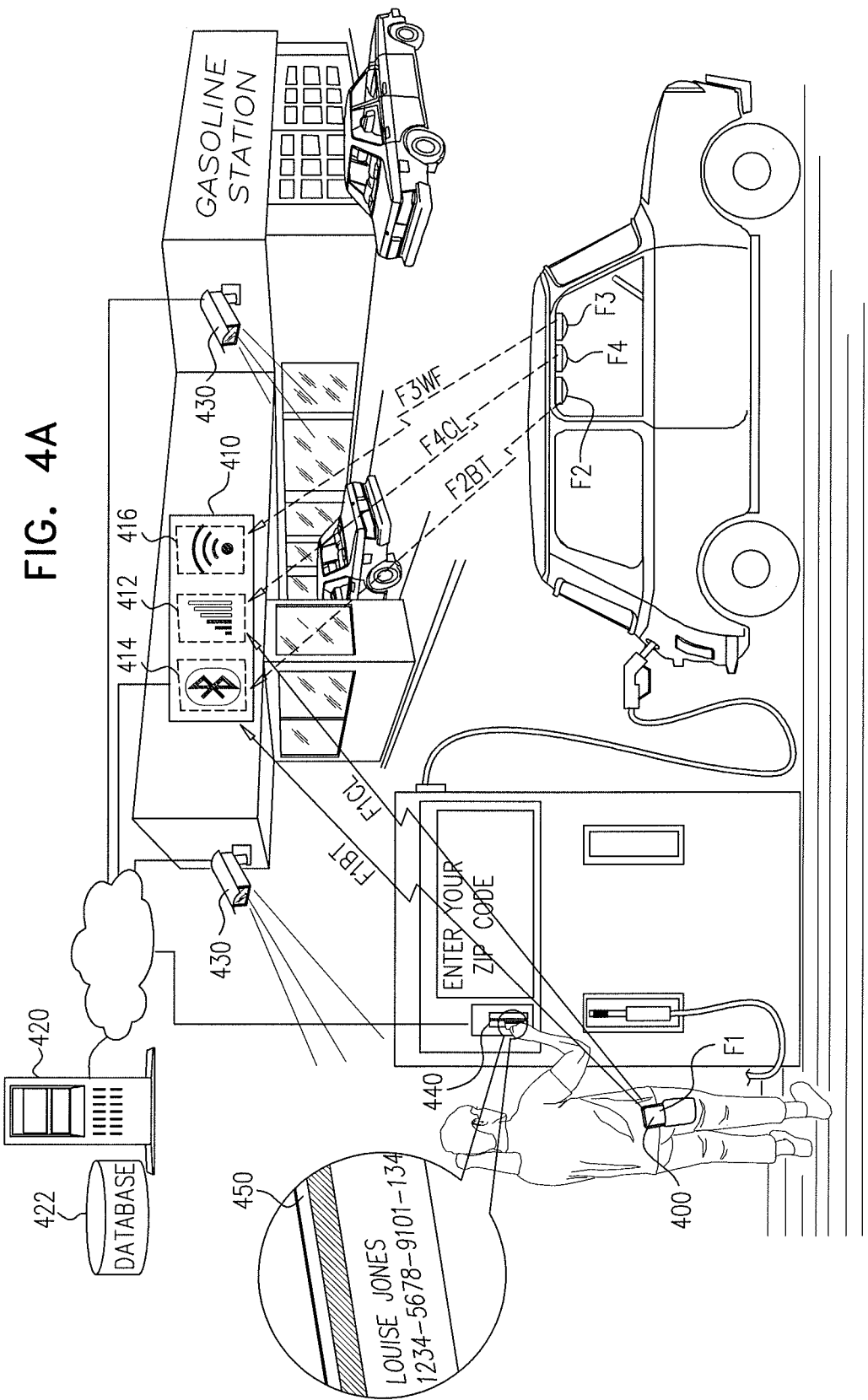
FIGS. 4A-4C are simplified illustrations of the operation of a computerized system for associating RF signals constructed and operative in accordance with still another preferred embodiment of the present invention.
Figure 4B:
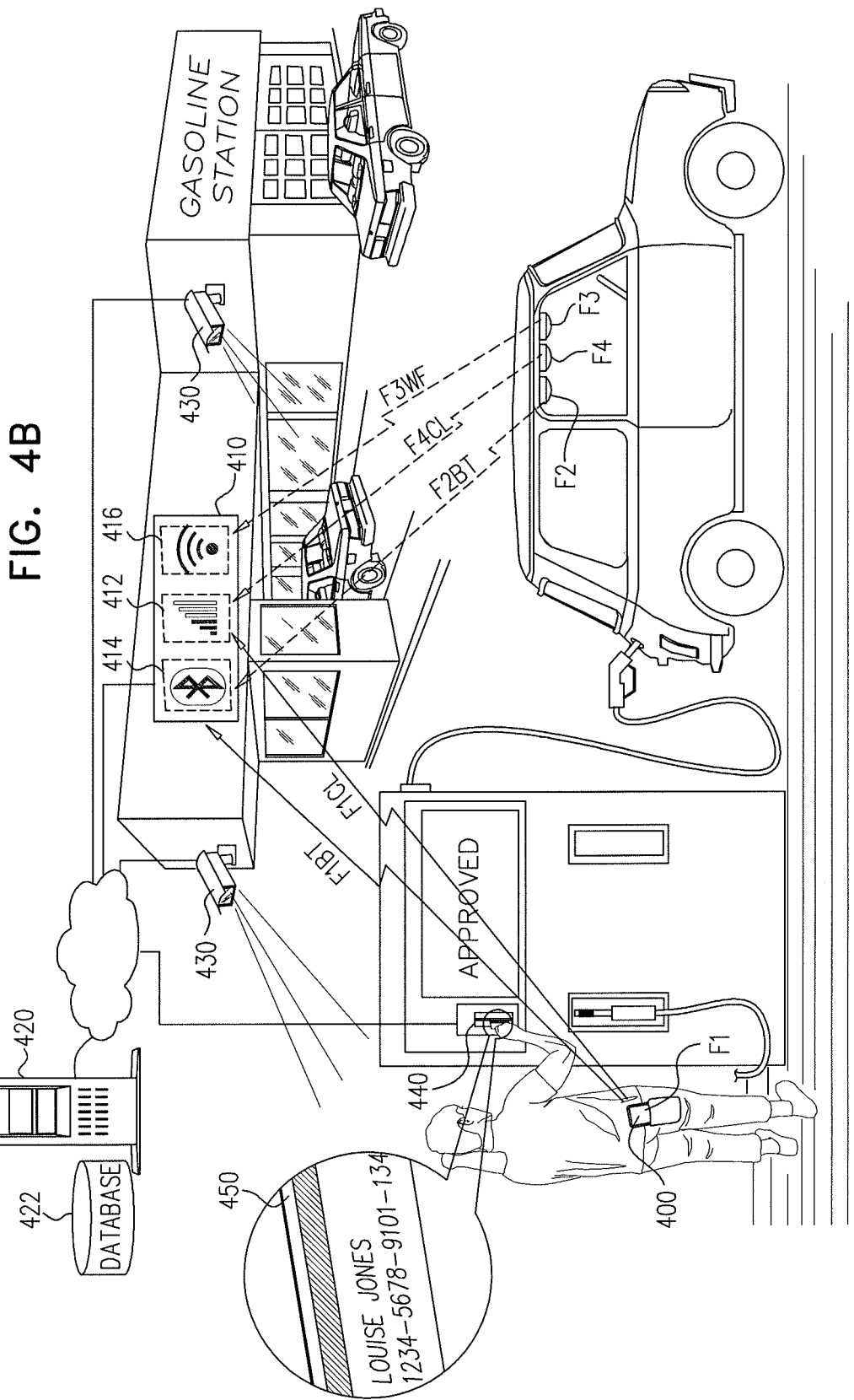
Figure 4C:
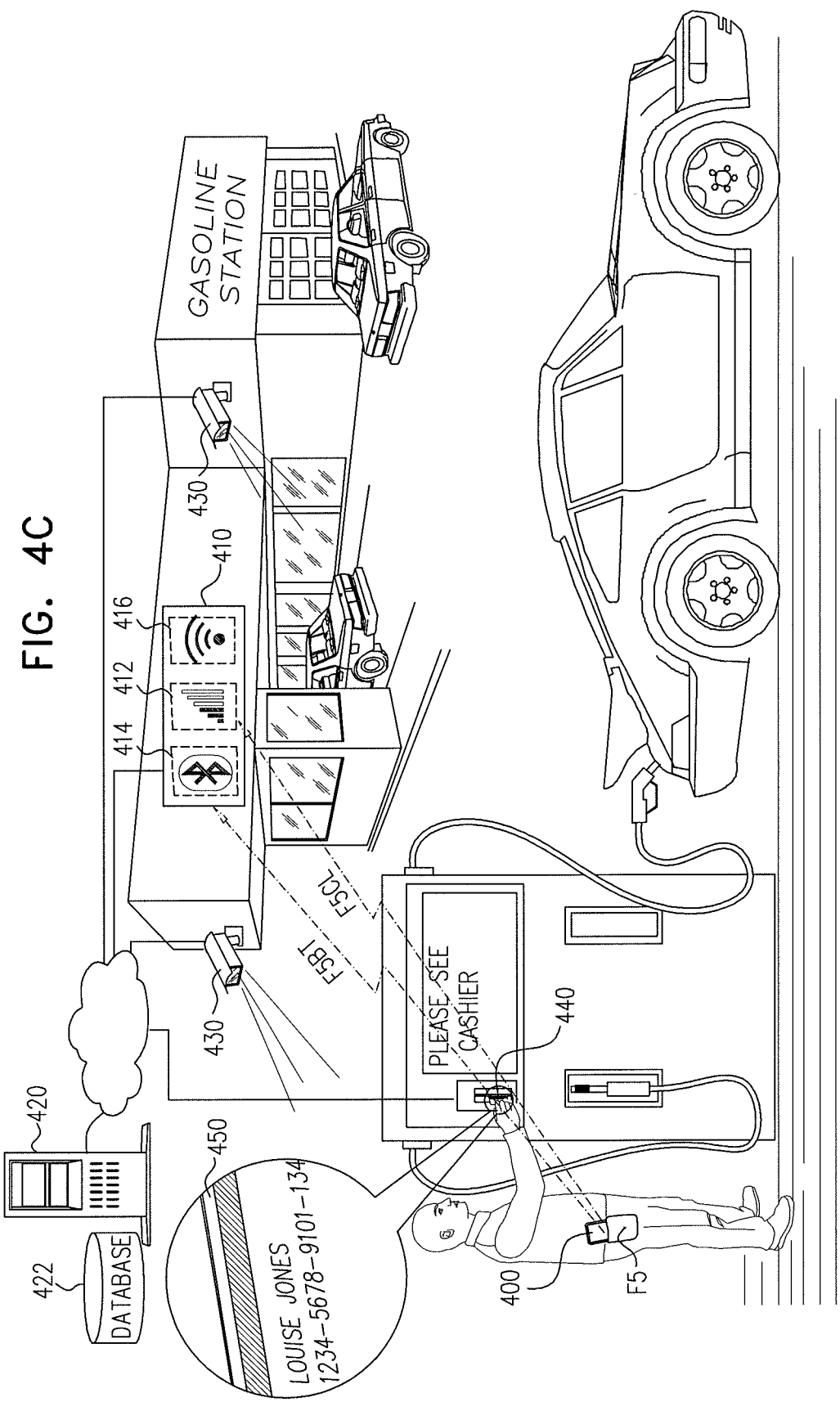

Reference is now made to FIGS. 4A-4C, which are simplified illustrations of the operation of a computerized system for associating RF signals constructed and operative in accordance with yet another preferred embodiment of the present invention.

As seen in FIGS. 4A-4C, in a typical scenario, an individual and the individual's vehicle are present at a venue, such as a gas pump at a gas station. The individual has in her pocket an RF communications device 400, such as a Bluetooth enabled cellular telephone. The vehicle includes Bluetooth, WIFI and Cellular communication RF communications devices 400, each typically manufactured by a different manufacturer.

Each RF communications device 400 outputs at least one unique, device identifying RF (UDIRF) signal. A typical RF communications device 400 may output multiple UDIRF signals, each typically in a different RF frequency band.

A sensor assembly 410 is located at the gas pump and is configured to receive the UDIRF signals from the various RF communications devices 400 at the venue. For example, sensor assembly 410 may include a cellular signal receiver 412, a Bluetooth signal receiver 414 and a WIFI signal receiver 416. Outputs of the sensor assembly 410 are preferably supplied via any suitable communication network to a server 420, having associated therewith at least one database 422. Preferably, at least one camera 430 is provided at the venue to photograph individuals. Outputs of camera 430 are also preferably supplied via any suitable communication network to server 420. A point of sale terminal 440 is preferably incorporated in the gas pump and an output thereof may be supplied via any suitable communication network to server 420.

Turning initially to FIG. 4A, it is seen that four RF communications devices 400 are seen to be present in the venue at a given time. The cellular telephone in the pocket of the individual is labeled F1 and typically outputs two UDIRF signals, typically a Bluetooth signal and a cellular telephone signal, here respectively designated as F1BT and F1CL. The Bluetooth RF communications device 400 is labeled F2 and outputs one UDIRF signal, a Bluetooth signal, here designated as F2BT.

The WIFI RF communications device 400 is labeled F3 and outputs a single UDIRF signal, a WIFI signal, here designated as F3WF. The cellular telephone in the vehicle is labeled F4 and outputs one UDIRF signals, typically a cellular telephone signal F4CL.

In accordance with a preferred embodiment of the present invention, sensor assembly 410 receives all of the above UDIRF signals from devices F1-F4 and transmits to server 420 at least the device identifiers which form part of the UDIRF signals preferably together with a timestamp and preferably together with a metric of signal strength which provides information relating to relative location of the device in the venue. If multiple sensor assemblies 410 are provided, triangulation may be employed to enhance location information. The timestamp may be provided by one or more of RF communications devices 400, sensor assembly 410 and server 420.

An image of the individual is typically but not necessarily acquired by camera 430. Such image is preferably linked to the unique multiple RF signal-based identifier generated based on the RF signals and provides a unique multiple RF signal-based individual identifier.

The individual here uses her payment card, here designated by reference numeral 450, in an unattended transaction and is prompted to enter her ZIP code as a security measure. The payment card information, which is also supplied to server 420, is linked to the unique identifier generated based on the RF signals and provides a unique multiple RF signal-based transaction identifier.

Turning now additionally to FIG. 4B, which shows the same individual at a gas pump in another instance, which may be days or weeks following the instance shown in FIG. 4A. It is appreciated that the gas pump may be the same gas pump as shown in FIG. 4A or may be a different gas pump at a different gas station, if the servers 420 associated with the various gas pumps and/or gas stations communicate system data with each other.

It is seen that the same four RF communications devices 400 are seen to be present at the gas pump in this instance as well. The cellular telephone F1 in the pocket of the individual typically outputs a Bluetooth signal and a cellular telephone signal, respectively F1BT and F1CL. The Bluetooth RF communications device F2 outputs a Bluetooth signal F2BT.

The WIFI RF communications device F3 outputs a WIFI signal F3WF and the cellular telephone F4 in the vehicle outputs a cellular telephone signal F4CL.

In accordance with a preferred embodiment of the present invention, sensor assembly 410 receives all of the above UDIRF signals from devices F1-F4 and transmits to server 420 at least the device identifiers which form part of the UDIRF signals preferably together with a timestamp and preferably together with a metric of signal strength which provides information relating to relative location of the device in the venue. If multiple sensor assemblies 410 are provided, triangulation may be employed to enhance location information. The timestamp may be provided by one or more of RF communications devices 400, sensor assembly 410 and server 420.

Here it is seen that a unique multiple RF signal-based transaction-based individual identifier, which was acquired by the system based on the UDIRF signals, an image and a payment card number, as described hereinabove with reference to FIG. 4A, is compared with a unique multiple RF signal-based proposed transaction-based individual identifier, which is acquired by the system based on the UDIRF signals, an image and a payment card number, as described hereinabove with reference to FIG. 4B.

The unique multiple RF signal-based transaction identifier, which was acquired by the system based on at least some of the device identifiers included in the UDIRF signals from devices F1-F4 and/or an image and/or payment card number as described hereinabove with reference to FIG. 4A and possibly in various other venues whose servers share unique identifier information of this type, is employed by server 420 to recognize the individual based on the fact that the same combination or a subcombination of the UDIRF signals and/or an image and/or payment card number, are used to generate the unique multiple RF signal-based proposed transaction identifier as in FIG. 4B.

In this case, both the individual and the payment card presented by the individual are known from the unique multiple RF signal-based transaction identifier and, upon swiping of the payment card, the individual is not asked to enter her ZIP code, since it is concluded that no further security input is required for the transaction.

It is appreciated that in response to each subsequent transaction in which the unique multiple RF signal-based identifier, unique multiple RF signal-based individual identifier or unique multiple RF signal-based transaction identifier is matched, the confidence level associated with that unique identifier increases.

Based only on timestamps, a typical unique multiple RF signal-based identifier may be visualized as all or part of the following:

MACF1BT/UDIDF1CL/MACF2BT/MACF3WF/ UDIDF1CL having a relatively low initial confidence level. This low initial confidence level may be increased by multiple simultaneous sensing of this unique multiple RF signal-based identifier.

In this case, since all of the various RF communications devices 400 in the vehicle are manufactured by different manufacturers, the sequential or non-sequential relationship between the MAC addresses is not relevant.

One or more unique multiple RF signal-based individual identifiers having a high confidence level may also be provided based on some or all of the foregoing information in addition to one or more photographs of the individual in whose possession the devices are present.

Accordingly, a unique multiple RF signal-based individual identifier may be visualized as all or part of the following:

MACF1BT/UDIDF1CL/MACF2BT/MACF3WF/ UDIDF1CL/FACEPHOTO having an intermediate initial confidence level. This intermediate initial confidence level may be increased by multiple simultaneous sensing of this unique multiple RF signal-based individual identifier.

A unique multiple RF signal-based transaction-based individual identifier having a high confidence level may also be provided based on some or all of the foregoing information in addition to transaction information, such as payment card information, obtained from the point of sale terminal 440.

Where payment is made by a payment card via point of sale terminal 440, a typical unique multiple RF signal-based transaction identifier may be visualized as all or part of the following:

MACF1BT/UDIDF1CL/MACF2BT/MACF3WF/ UDIDF1CL/PAYMENT CARD NUMBER

A typical unique multiple RF signal-based, transaction-based individual identifier may be visualized as all or part of the following:

MACF1BT/UDIDF1CL/MACF2BT/MACF3WF/ UDIDF1CL/FACE PHOTO/PAYMENT CARD NUMBER

It is appreciated that in the above-described embodiment of the present invention, the degree of confidence realized by the system for any unique multiple RF signal-based identifier, unique multiple RF signal-based individual identifier and transaction-based identifier is typically a function of the number of occurrences in which multiple signals are simultaneously received by at least one sensor assembly 410. Accordingly, typically the degree of confidence of any given unique multiple RF signal-based identifier, unique multiple RF signal-based individual identifier and unique multiple RF signal-based transaction identifier increases over time.

Turning now additionally to FIG. 4C, which shows a different individual at a gas pump in a further instance, which may be days or weeks following the instances shown in FIG. 4A and FIG. 4B. It is appreciated that the gas pump may be the same gas pump as shown in FIG. 4A or may be a different gas pump at a different gas station, if the servers 420 associated with the various gas pumps and/or gas stations communicate system data with each other.

It is seen that none of the four RF communications devices F1, F2, F3 and F4 are sensed as being present at the gas pump in this instance. A cellular telephone F5 in the pocket of the different individual typically outputs a Bluetooth signal and a cellular telephone signal, respectively F5BT and F5CL.

Here the different individual swipes a stolen payment card, in this case, the payment card that was used by the individual as described in FIGS. 4A & 4B. The payment card is not accepted and the different individual is directed to the cashier.

Here it is seen that a unique multiple RF signal-based transaction-based individual identifier, which was acquired by the system based on the UDIRF signals, an image and a payment card number, as described hereinabove with reference to FIGS. 4A and 4B, is compared with a unique multiple RF signal-based proposed transaction-based individual identifier, which is acquired by the system based on the UDIRF signals, an image and a payment card number, as described hereinabove with reference to FIG. 4C.

Here it is further seen that the unique multiple RF signal-based transaction identifier is employed by server 420 to decide that the individual presenting the same payment card as used in the instances described above with reference to FIGS. 4A & 4B is not the same individual as in the instances described above with reference to FIGS. 4A & 4B.

This decision is based on the fact that the same combination or a subcombination of the UDIRF signals, image and payment card number that were sensed earlier, as described hereinabove with reference to FIGS. 4A and 4B, and possibly in various other venues whose servers share unique identifier information of this type, were not sensed in the instance of FIG. 4C. In other terms, the unique multiple RF signal-based proposed transaction identifier acquired in the instance shown in FIG. 4C does not match the unique multiple RF signal-based transaction identifier earlier acquired by the system As in FIGS. 4A & 4B.

It is appreciated that the embodiments of the system and their methodologies described hereinabove may provide all of the various unique RF signal based identifiers even in the absence of cameras.

Figure 5:
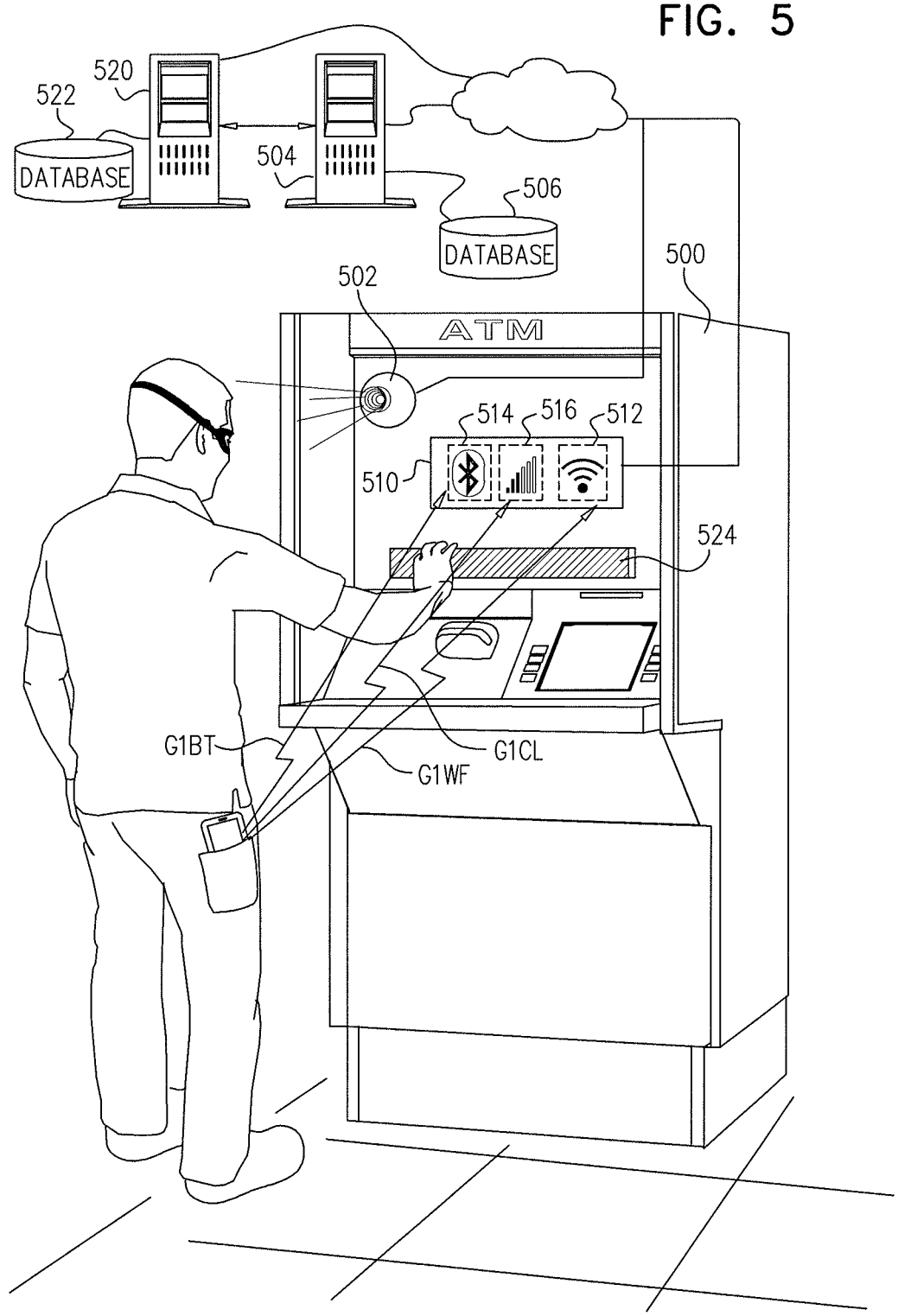
FIG. 5 is a simplified illustration of the operation of a computerized system for associating RF signals constructed and operative in accordance with a further preferred embodiment of the present invention.

An additional feature of an embodiment of the present invention is non-visual signal (RF) surveillance, which can be combined, but need not be combined, with conventional visual surveillance. Reference is now made to FIG. 5, which is a simplified illustration of an example of combined visual and non-visual surveillance. This example relates to monitoring of RF skimmers at an Automated Teller Machine (ATM), but illustrates the capabilities of the system for any suitable type of combined visual and RF surveillance.

In accordance with a preferred embodiment of the invention, an ATM 500 is equipped with a video surveillance camera 502 for filming persons in the immediate vicinity of the ATM and assigning a date and time stamp to each video frame. The output of the video surveillance camera is preferably wirelessly communicated to a server 504 and a database 506.

Further in accordance with a preferred embodiment of the present invention, the ATM 500 is also equipped with an RF sensor assembly 510. For example, each sensor assembly 510 may include a cellular signal receiver 512, a Bluetooth signal receiver 514 and a WIFI signal receiver 516. Outputs of the one or more sensor assemblies 510 are preferably supplied via any suitable communication network to a server 520, having associated therewith at least one database 522. It is appreciated that server 520 may be integrated with server 504 and that database 522 may be integrated with database 506.

Upon detection of a security event, such as a surreptitious installation of a skimmer 524 in the vicinity of the ATM 500, the relevant stored output of the video surveillance camera is searched in a conventional manner in order to ascertain the date and time of such installation, and preferably also a photograph of the person involved. Once the date and time of such surreptitious installation are ascertained, database 522 may be searched to ascertain which RF signals were sensed by the sensor assembly 510 at that date and time. In this case, the person surreptitiously installing the skimmer 524 carried with him a smartphone typically transmitting WIFI, Bluetooth and cellular telephone signals, herein referred to as G1WF, G1BT and G1CL respectively, hereinafter referred to as "a suspect combination of RF signals".

Once the identifiers of the RF signals at the date and time of the installation of the skimmer are ascertained, the output of the sensor assembly 510 may be monitored in real time or near real time to provide an alert of when that combination of RF signals G1WF, G1BT and G1CL or a subcombination thereof is subsequently sensed at the ATM or at another ATM. Upon receipt of such an alert, protective action, such as contacting law enforcement or inspecting the relevant ATM for the presence of skimmers, may be taken.

Additionally, the output of the video surveillance camera stored in database 506 may be searched for the date and time of the subsequently sensed suspect combination of RF signals or a subcombination thereof in order to possibly provide a video match of the person involved.

Figure 6:
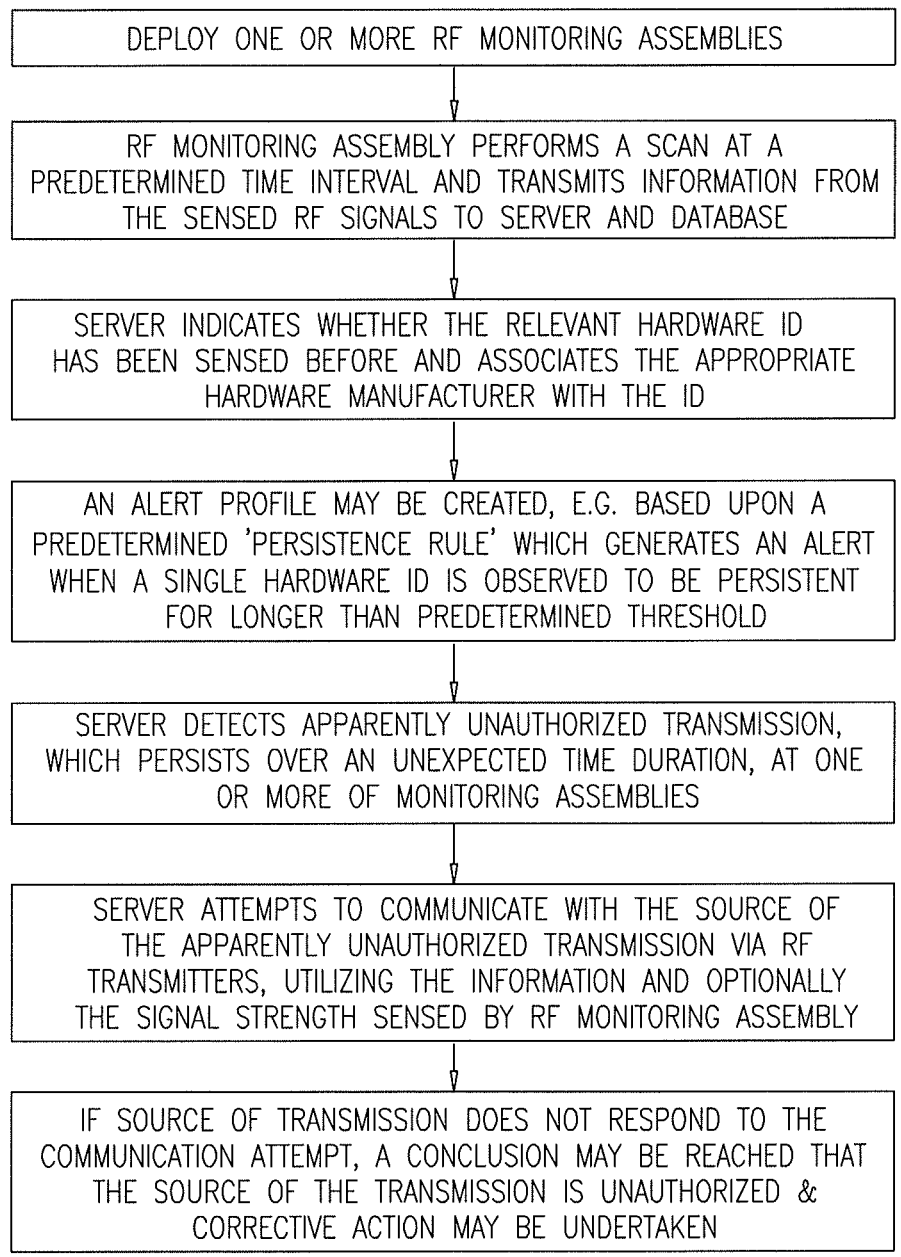
FIG. 6 is a simplified flowchart illustrating the operation of a computerized system for associating RF signals constructed and operative in accordance with a still further preferred embodiment of the present invention.

A further feature of an embodiment of the present invention is monitoring a space for unauthorized RF transmitters. Reference is now made to FIG. 6, which is a simplified flowchart of an example of monitoring a space, such as a commercial space in a mall, for unauthorized RF transmitters.

In accordance with a preferred embodiment of the present invention, an RF monitoring assembly is located in the commercial space. For example, each RF monitoring assembly may include a cellular signal receiver, a Bluetooth signal receiver and a WIFI signal receiver. Outputs of the one or more sensor assemblies are preferably supplied via any suitable communication network to a server, having associated therewith at least one database. One or more RF transmitters are also preferably located in the commercial space.

Upon sensing by the RF monitoring assembly of an apparently unauthorized transmission, which persists over an unexpected time duration, such as, for example, 20 minutes, the server may try to communicate with the source of the transmission via the RF transmitters by using the ALODRAS information and optionally the signal strength sensed by the RF monitoring assembly. If the source of the transmission does not respond to the attempt to communicate, a conclusion may be reached that the source of the transmission is an unauthorized beacon. In such a case, corrective action, such as physical search for the beacon, may be undertaken.

In a specific example relating to Bluetooth signals, a commercially-available software system may be employed for analyzing the output of the RF monitoring assembly. Such system may determine that Hardware IDs corresponding to the RF signals sensed by the RF monitoring assembly have not been sensed previously, and performs a Hardware ID query against a publicly-available Hardware ID lookup service to determine the hardware manufacturer of the Bluetooth devices transmitting the sensed Bluetooth signals.

In this example, the RF monitoring assembly is typically programmed to perform a scan at a predetermined interval, typically every 5 minutes, and to transmit the ALODRAS information from the sensed RF signals to the server.

A typical transmission to the server and the database is shown in Table 1 below.

TABLE 1

| Protocol | Bluetooth |
| --- | --- |
| Hardware ID | 34-02-86-C6-A6-8C |
| Max Signal Strength | −72 dBm |
| Time & Date | Sep. 30, 2015 12:21:07 |
| Status | Broadcasting |

The server and the database indicate whether the relevant Hardware ID has been sensed before and associate the appropriate Hardware Manufacturer with the ID.

A typical output is shown is Table 2 below.

TABLE 2

| Protocol | Bluetooth |
| --- | --- |
| Hardware ID | 34-02-86-C6-A6-8C |
| Hardware Manufacturer | Intel |
| Max Signal Strength | −72 dBm |
| Time & Date | Sep. 30, 2015 12:21:07 |
| Status | Broadcasting |

An alert profile may be created based upon a predetermined 'Persistence Rule' which generates an alert if a single Hardware ID is observed to be persistent for longer than a predetermined threshold, such as 20 consecutive minutes. Additionally, an alert profile may also be created based upon matching a single Hardware ID to a Hardware ID found in an Unauthenticated or Unauthorized list in the database. An alert may be provided to a system operator or to an automated response system.

The system operator reviews the Hardware ID and may decide to gather additional information about the Bluetooth communications originating from the device with that particular Hardware ID. Preferably, an interrogation command may be sent to the persistently detected device, which sets the device's Bluetooth interface to an 'Open Pairing' configuration to determine if the persistently detected device is capable of completing a protocol-appropriate pairing association.

For example, the device may return a 'Data Transmission Only' command, indicating that this particular detected Bluetooth device is only capable of data transmission over Bluetooth (and not hands-free phone or multi-media playback). The system preferably attempts a data transmission request and the Bluetooth device may return a PIN request. The system preferably gathers this data, associates it with the signal strengths observed with the appropriate Date/Time stamp and stores the gathered data in the database.

The system preferably analyzes the gathered data and may then run another rule set against the data. In this example, the owner of the property where the RF monitoring assembly is located has requested that any device detected with a persistent presence of greater than 20 minutes which is only capable of Bluetooth data transmission will trigger an automated alert. The property owner may employ a web portal to configure his communications preferences. For these types of alerts, he may select 'Notify me via SMS'.

The system preferably collects the relevant details, such as date and time of first observance, hardware manufacturer and/or signal strength, formats an appropriate SMS message including the relevant details and preferably sends the SMS message to a mobile communications gateway service to assure delivery of the SMS message to the property owner.

Various particular features of this embodiment of the present invention include providing automated detection of new wireless communications devices in a space through a combination of passive and active communications techniques, the correlation of device identifiers against rule sets and the automated execution of alerts based upon those rule sets.

Figure 7:
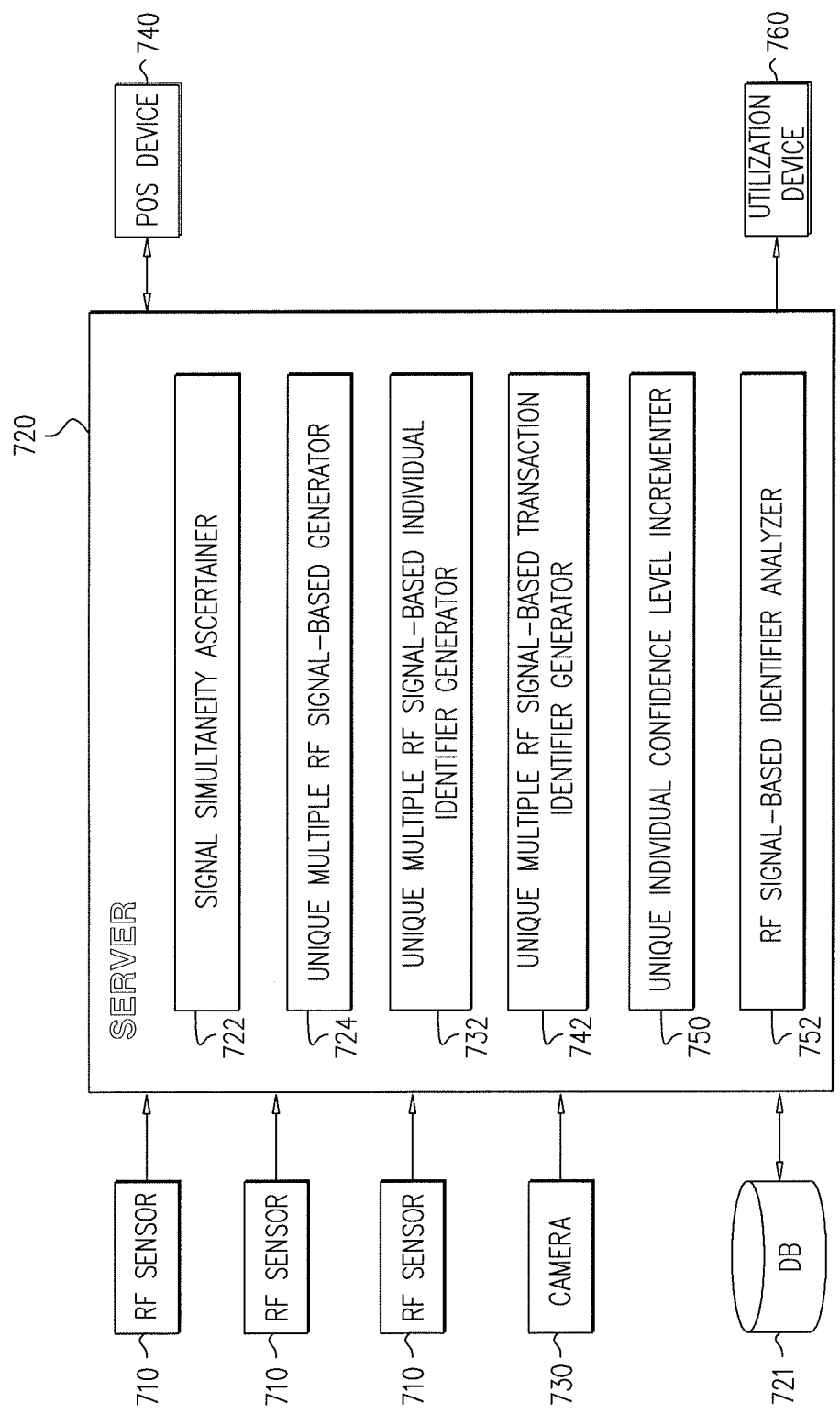
FIG. 7 is a simplified functional block diagram of a computerized system for associating RF signals constructed and operative in accordance with a preferred embodiment of the present invention.

Reference is now made to FIG. 7, which is a simplified functional block diagram of an embodiment of the system of the present invention. As illustrated in FIG. 7, one or more RF sensor assemblies 710, examples of which are described above with reference to sensor assemblies 110, 170, 210, 310, 410 and 510, sense RF signals of various types, such as Bluetooth, WIFI, NFC and cellular telephone signals and preferably provide, at a plurality of instances mutually separated in time, ALODRAS data and preferably also signal strength metric data relating to a plurality of simultaneously sensed RF signals to a server 720, examples of which are described above with reference to servers 120, 220, 320, 420 and 520, and to an associated database 721, examples of which are described above with reference to databases 122, 222, 322, 422, 506 and 522.

In accordance with a preferred embodiment of the present invention, the server 720 includes a signal simultaneity ascertainer 722, which ascertains which RF signals are being received at least partially at the same time. Ascertainer 722 preferably outputs to a unique multiple RF signal-based identifier generator 724. Unique multiple RF signal-based identifier generator 724, based on the ALODRAS data and preferably also the signal strength metric data relating to a plurality of simultaneously sensed RF signals, is operative to create at least one unique multiple RF signal-based identifier.

Additionally, in accordance with a preferred embodiment of the present invention, the system may include at least one camera 730, examples of which are described above with reference to camera 130, 230, 330, 430 and 530, which is capable of photographing at least one person at at least some of the aforesaid plurality of instances mutually separated in time, and is operative to transmit the resulting photographs to server 720.

In accordance with a preferred embodiment of the present invention, server 720 may include a unique multiple RF signal-based individual identifier generator 732. Unique multiple RF signal-based individual identifier generator 732 associates the photographs with the ALODRAS data and preferably also signal strength metric data relating to the plurality of simultaneously sensed RF signals according to their respective time stamps and thus creates at least one unique multiple RF signal-based individual identifier, which is a preferably a combination of each at least one unique multiple RF signal-based identifier, with at least one photograph.

Further in accordance with a preferred embodiment of the present invention, the system may include at least one point of sale device 740, examples of which are described above with reference to point of sale devices 140, 240, 340, 440 and 540, which is capable of providing transaction data, such as a payment card number used at at least some of the aforesaid plurality of instances mutually separated in time, and is operative to transmit the transaction data to server 720.

In accordance with a preferred embodiment of the present invention, server 720 may include a unique multiple RF signal-based transaction identifier generator 742. Unique multiple RF signal-based individual identifier generator 742 associates the transaction data with the ALODRAS data and preferably also signal strength metric data relating to the plurality of simultaneously sensed RF signals and optionally with one or more photographs from one or more cameras 730 according to their respective time stamps and thus creates at least one unique multiple RF signal-based transaction identifier, which is a preferably a combination of each at least one unique multiple RF signal-based identifier, with corresponding transaction data.

Additionally in accordance with a preferred embodiment of the present invention, server 720 includes a unique identifier confidence level incrementer 750, which assigns a confidence level to each unique identifier and changes the confidence level of each unique identifier over time in response to the presence or absence of sensed combinations or subcombinations of simultaneously sensed RF signals and optionally photographs and transaction data. The unique identifier confidence level incrementer 750 preferably maintains up to date confidence levels and confidence level threshold indicators for all unique multiple RF signal-based identifiers, unique multiple RF signal-based individual identifiers and unique multiple RF signal-based transaction identifiers.

Further in accordance with a preferred embodiment of the present invention, there is provided an RF signal-based identifier analyzer 752 which employs one or more multiple RF signal-based identifiers to realize conclusions as to the presence or absence of devices and/or individuals at a given time. One type of an RF signal-based identifier analyzer is operative to identify the presence or absence of a given individual at a given location at a given time. Examples of this type of RF signal-based identifier analyzer are described hereinabove with reference to FIGS. 1A-5.

Another type of signal-based identifier analyzer is operative to identify the presence or absence of a given device at a given location at a given time. An example of this type of RF signal-based identifier analyzer is described hereinabove with reference to FIG. 6.

Further in accordance with a preferred embodiment of the present invention, the server 720, cooperating with database 721, provides output indications of unique multiple RF signal-based identifiers, unique multiple RF signal-based individual identifiers and unique multiple RF signal-based transaction identifiers together with their respective confidence level metrics to one or more utilization device 760. Typically, the output indication is generated by RF signal-based identifier analyzer 752.

Examples of suitable utilization devices may include the following:

A personalized welcome display, welcoming a customer to a venue by name and/or with an offer which is specifically tailored to the customer's preferences and/or demographics;

A display facing a sales clerk at a point of sale instructing the sales clerk to request a picture ID from a customer;

A user interface at a gas station requiring entry of a ZIP code prior to completing a transaction;

A security annunciator informing a security official of the presence of an unauthorized person or device at a given location;

A User Interface at ATM Machine requiring entry of a PIN Code prior to completion of transaction; and A User Interface at a Parking Lot Vending Machine requiring entry of ZIP code to complete the transaction with the card.

It will be appreciated by persons skilled in the art that the present invention is not limited to what has been particularly shown and described hereinabove. Rather the scope of the invention includes combinations and sub-combinations of features described hereinabove as well as modifications and variations thereof which would occur to a person skilled in the art upon reading the foregoing and which are not in the prior art.

The invention claimed is:

1. A computerized transactional security method comprising:
   receiving at one of a plurality of sensor assemblies and in a first transaction with a payment card a first set of unique device identifying RF (UDIRF) signals output by one or more RF communication devices, each of the UDIRF signals uniquely identifying one of the one or more RF communication devices;
   receiving at one of the plurality of sensor assemblies and in a second transaction with the payment card a second set of UDIRF signals;
   at least one computer processor identifying a subset of UDIRF signals common to both the first set of UDIRF signals and the second set of UDIRF signals;
   the at least one computer processor associating said subset of UDIRF signals with the payment card; and
   the at least one computer processor authenticating a third transaction with the payment card using said subset of UDIRF signals.

2. The computerized transactional security method of claim 1, wherein authenticating a third transaction with the payment card using said subset of UDIRF signals comprises:
   receiving at one of the plurality of sensor assemblies a third set of UDIRF signals;
   determining if the subset of UDIRF signals is present in the third set of UDIRF signals;
   authenticating the third transaction in response to the subset of UDIRF signals being present in the third set of UDIRF signals; and
   rejecting the third transaction in response to the subset of UDIRF signals not being present in the third set of UDIRF signals.

3. The computerized transactional security method according to claim 2, further comprising providing an alert in response to the subset of UDIRF signals not being present in the third set of UDIRF signals.

4. A computerized transactional security system, comprising:
   a plurality of sensors; and
   a computer processor;
   wherein:
      one of a plurality of sensor assemblies receives in a first transaction with a payment card a first set of unique device identifying RF (UDIRF) signals output by one or more RF communication devices, each of the UDIRF signals uniquely identifying one of the one or more RF communication devices;
      one of the plurality of sensor assemblies receives in a second transaction with the payment card a second set of UDIRF signals;
      the at least one computer processor identifies a subset of UDIRF signals common to both the first set of UDIRF signals and the second set of UDIRF signals;
      the at least one computer processor associates said subset of UDIRF signals with the payment card; and
      the at least one computer processor authenticates a third transaction with the payment transaction using said subset of UDIRF signals.

5. The computerized transactional security system of claim 4, wherein the third transaction with the payment card is authenticated by:
   one of the plurality of sensor assemblies receiving a third set of UDIRF signals;
   the at least one computer processor determining if the subset of UDIRF signals is present in the third set of UDIRF signals;
   the at least one computer processor authenticating the third transaction in response to the subset of UDIRF signals being present in the third set of UDIRF signal; and
   the at least one computer processor rejecting the third transaction in response to the subset of UDIRF signals not being present in the third set of UDIRF signals.

6. The computerized transactional security system according to claim 5, wherein the at least one computer processor provides an alert in response to the subset of UDIRF signals not being present in the third set of UDIRF signals.

\* \* \* \* \*